United States Patent
Nishimoto et al.

[11] Patent Number: 6,128,576
[45] Date of Patent: Oct. 3, 2000

[54] OBSTRUCTION DETECTING APPARATUS

[75] Inventors: Yukio Nishimoto; Daisuke Hara, both of Tokyo, Japan

[73] Assignee: Mitsubishi Denki Kabushiki Kaisha, Tokyo, Japan

[21] Appl. No.: 09/209,448

[22] Filed: Dec. 11, 1998

[30] Foreign Application Priority Data

Jul. 13, 1998 [JP] Japan .................................. 10-197778

[51] Int. Cl.$^7$ .............................. G01S 15/04; G01S 15/06
[52] U.S. Cl. ........................... 701/301; 340/435; 367/111
[58] Field of Search ........................... 701/301; 340/435, 340/436; 180/167, 169; 367/107, 111, 909

[56] References Cited

U.S. PATENT DOCUMENTS

| | | | |
|---|---|---|---|
| 4,490,716 | 12/1984 | Tsuda et al. | 340/904 |
| 4,528,563 | 7/1985 | Takeuchi | 340/903 |
| 4,903,004 | 2/1990 | Starke et al. | 340/425.5 |
| 5,059,946 | 10/1991 | Hollowbush | 340/435 |
| 5,572,484 | 11/1996 | Gaus et al. | 367/99 |
| 5,689,250 | 11/1997 | Kremser | 340/904 |

FOREIGN PATENT DOCUMENTS

| | | |
|---|---|---|
| 62-59880 | 3/1987 | Japan . |
| 62-16374 | 4/1987 | Japan . |
| 2264782A | 9/1993 | United Kingdom . |

*Primary Examiner*—Michael J. Zanelli
*Attorney, Agent, or Firm*—Sughrue, Mion, Zinn, Macpeak & Seas, PLLC

[57] ABSTRACT

In the obstruction detection apparatus incorporated in a vehicle (11), ultrasonic wave transmitter/receiver (16 to 19 171) for changing a combination of transmitting of ultrasonic waves and of receiving of reflected ultrasonic waves, a CPU (20) calculates a distance between the vehicle (11) and an obstruction and stores data corresponding to the calculated distance into the distance table (23), and the LC display device (27) displays the obstruction on display bars of a lattice shape corresponding to the data stored in the distance table (23), and a buzzer (26) sounds an alarm for a driver.

23 Claims, 20 Drawing Sheets

FIG.7

DISTANCE TABLE 23

| SENSED DISTANCE | 19a | 18b 18a | 17b 17a | 16b 16a | | | |
|---|---|---|---|---|---|---|---|
| 0~30cm | | | | | | | F0 |
| 30~40cm | | | | | | | F1 |
| 40~50cm | | | | | | | F2 |
| 50~60cm | | | | | | | F3 |
| 60~70cm | | | | | | | F4 |
| 70~80cm | | | | | | | F5 |
| 80~90cm | | | | | | | F6 |
| 90~100cm | | | | | | | F7 |

FIG.8

DISTANCE TABLE 23

| SENSED DISTANCE | 19a | 18b | 18a | 17b | 17a | 16b | 16a | |
|---|---|---|---|---|---|---|---|---|
| 0~30cm | 0 | 0 | 0 | 0 | 0 | 0 | 0 | F0 |
| 30~40cm | 0 | 0 | 0 | 0 | 0 | 0 | 0 | F1 |
| 40~50cm | 0 | 0 | 0 | 0 | 0 | 0 | 0 | F2 |
| 50~60cm | 0 | 0 | 0 | 0 | 0 | 0 | 0 | F3 |
| 60~70cm | 0 | 0 | 0 | 0 | 0 | 0 | 0 | F4 |
| 70~80cm | 0 | 0 | 0 | 0 | 1 | 1 | 1 | F5 |
| 80~90cm | 0 | 0 | 0 | 0 | 0 | 0 | 0 | F6 |
| 90~100cm | 0 | 0 | 0 | 0 | 0 | 0 | 0 | F7 |

DISTANCE TABLE 23

| SENSED DISTANCE | 19a | 18b 18a | 17b 17a | 16b 16a | |
|---|---|---|---|---|---|---|---|
| 0~30cm | 1 | 1 | 1 | 1 | 1 | 1 | 1 | F0 |
| 30~40cm | 1 | 1 | 1 | 1 | 1 | 1 | 1 | F1 |
| 40~50cm | 1 | 1 | 1 | 1 | 1 | 1 | 1 | F2 |
| 50~60cm | 1 | 1 | 1 | 1 | 1 | 1 | 1 | F3 |
| 60~70cm | 1 | 1 | 1 | 1 | 1 | 1 | 1 | F4 |
| 70~80cm | 1 | 1 | 1 | 1 | 0 | 0 | 0 | F5 |
| 80~90cm | 1 | 1 | 1 | 1 | 0 | 0 | 0 | F6 |
| 90~100cm | 1 | 1 | 1 | 1 | 0 | 0 | 0 | F7 |

OBSTRUCTION DETECTING APPARATUS

BACKGROUND OF THE INVENTION

1. Field of the Invention

The present invention relates to an obstruction detection apparatus incorporated in a vehicle for detecting the distance from the vehicle to an obstruction and the position of the obstruction, for displaying data corresponding to the distance to the obstruction and the position of the obstruction to a driver of the vehicle on a Liquid Crystal (LC) display, and for sounding an alarm for the driver through an alarm device incorporated in the vehicle.

2. Description of the Prior Art

FIG. 22 is a plane view showing a plurality of sensors forming a conventional obstruction detection apparatus incorporated in a vehicle that has been disclosed in a Japanese patent document, namely the Japanese patent laid-open publication Number JP-A-62/59880. FIG. 23 is a block diagram showing a configuration of the conventional obstruction detection apparatus shown in FIG. 22. In FIG. 23, the reference number 1 designates an vehicle, the reference numbers 2 to 5 denote sensors arranged on each corner of the vehicle 1. Each of the sensors 2 to 5 is connected to each of detection circuits 6 to 9, each including an oscillator (omitted from FIG. 23). Each of the sensors 2 to 5 detects an obstruction independently and transfers data about the detected obstruction to a display device 10 placed near the driver. This display device 10 comprising a plurality of display sections corresponding to areas around the sensors 2 to 5. This display device 10 is capable of displaying a distance between the vehicle 1 and the obstruction by using the number of display bars or bar segments. For example, when an obstruction is near the sensor 2, namely, when the obstruction is at the front right section of the right hand side of the vehicle 1 and when the vehicle 1 is moving toward this obstruction, the sensor 2 and the detection circuit 6 detect the position of the obstruction and instructs that the most inside display bar in the display device 10 lights up. Then, when the vehicle 1 is near the obstruction, for example, it almost contacts the obstruction, the most outside display bar in the front right section in the display device 10 lights up in order to inform the most danger state to the driver.

The display bars forming the display device 10 to inform the distance between the vehicle 1 and the obstruction light up in steps toward the outside of the figure showing the vehicle 1, as shown in FIG. 23, when the vehicle 1 is moving toward the obstruction because the conventional obstruction detection apparatus in the vehicle 1 has the configuration described above. Accordingly, the conventional obstruction detection apparatus has a drawback that it is difficult for the driver of the vehicle 1 to recognize the distance between the vehicle 1 and the obstruction and the position of the obstruction easily and preciously in sensibility.

Furthermore, for example, when both the display bars corresponding to the sensor 4 of the rear right side and the sensor 5 of the rear left side light up simultaneously, it is difficult for the driver to recognize whether the obstruction is near the rear right side or the rear left side and it is also difficult for the driver to recognize the information regarding the actual position of the obstruction, and it takes a long time for the driver to recognize the correct position of the obstruction because the driver only watches the number of the display bars lighting up on the display device 10.

SUMMARY OF THE INVENTION

Accordingly, an object of the present invention is, with due consideration to the drawbacks of the conventional technique, to provide an obstruction detection apparatus for vehicles capable of informing a correct distance between a vehicle and an obstruction and a correct position of the obstruction to a driver. Thereby, the driver can recognize the correct distance between the vehicle and the obstruction and the position of the obstruction easily in sensibility.

In accordance with a preferred embodiment of the present invention, an obstruction detection apparatus comprises a plurality of ultrasonic wave transmitter/receiver means installed on a vehicle for transmitting ultrasonic wave and for receiving the ultrasonic wave reflected by an obstruction, control means including a distance table for calculating a distance between said vehicle and said obstruction based on a time interval from a time at which the ultrasonic wave is transmitted to a time at which the ultrasonic wave reflected by said obstruction is received by said plurality of ultrasonic wave transmitter/receiver means and for storing data corresponding to the calculated distance into memory fields forming said distance table, display means for displaying a range where no obstruction is detected by said plurality of ultrasonic wave transmitter/receiver means based on the data stored in said distance table, and alarm means for sounding an alarm about said obstruction for a driver of said vehicle based on the data stored in said distance table.

In accordance with another preferred embodiment of the present invention, an obstruction detection apparatus comprises a plurality of ultrasonic wave transmitter/receiver means installed on a vehicle for transmitting ultrasonic wave and for receiving the ultrasonic wave reflected by an obstruction, control means including a distance table for calculating a distance between said vehicle and said obstruction based on a time interval from a time at which the ultrasonic wave is transmitted to a time at which the ultrasonic wave reflected by said obstruction is received by said plurality of ultrasonic wave transmitter/receiver means, and for storing data corresponding to the calculated distance into memory fields forming said distance table, display means for displaying a range where said obstruction is detected by said plurality of ultrasonic wave transmitter/receiver means based on the data stored in said distance table, and alarm means for sounding an alarm about said obstruction for a driver of said vehicle based on the data stored in said distance table.

In the obstruction detection apparatus as another preferred embodiment according to the present invention, said control means comprises said distance table comprising a plurality of memory fields corresponding to a case in which the same ultrasonic wave transmitter/receiver means transmits said ultrasonic wave and receives the ultrasonic wave reflected by said obstruction and a case in which the different ultrasonic wave transmitter/receiver means transmits the ultrasonic wave and receives the ultrasonic wave reflected by said obstruction.

In the obstruction detection apparatus as another preferred embodiment according to the present invention, at least one of said plurality of ultrasonic wave transmitter/receiver means are installed at corner sections of said vehicle, and when said ultrasonic wave transmitter/receiver means installed at said corner sections transmit the ultrasonic wave and directly receive the ultrasonic wave reflected by said obstruction, said control means uses said ultrasonic wave transmitter/receiver means as a corner sensor, and said display means displays information of a position of said obstruction obtained by said ultrasonic wave reflected by said obstruction.

In the obstruction detection apparatus as another preferred embodiment according to the present invention, said display means comprises a plurality of display bars of a lattice shape, and lights said display bars corresponding to data stored in said distance table.

In the obstruction detection apparatus as another preferred embodiment according to the present invention, said control means calculates a distance between said vehicle and said obstruction in consideration of a distance difference between a tip section of said vehicle and said plurality of ultrasonic wave transmitter/receiver means.

BRIEF DESCRIPTION OF THE DRAWINGS

These and other objects, features, aspects and advantages of the present invention will become more apparent from the following detailed description of the present invention when taken in conjunction with the accompanying drawings, in which:

FIG. 7 is a diagram showing a configuration of a distance table included in the CPU as control means;

FIG. 8 is a diagram showing the distance table in which data have been stored;

DESCRIPTION OF THE PREFERRED EMBODIMENTS

Other features of this invention will become apparent through the following description of preferred embodiments which are given for illustration of the invention and are not intended to be limiting thereof.
First Embodiment FIG. 1 is a diagram showing an arrangement and a sensing range of ultrasonic wave transmitter/receiver means forming the obstruction detection apparatus according to the first embodiment of the present invention.

Figure 1:
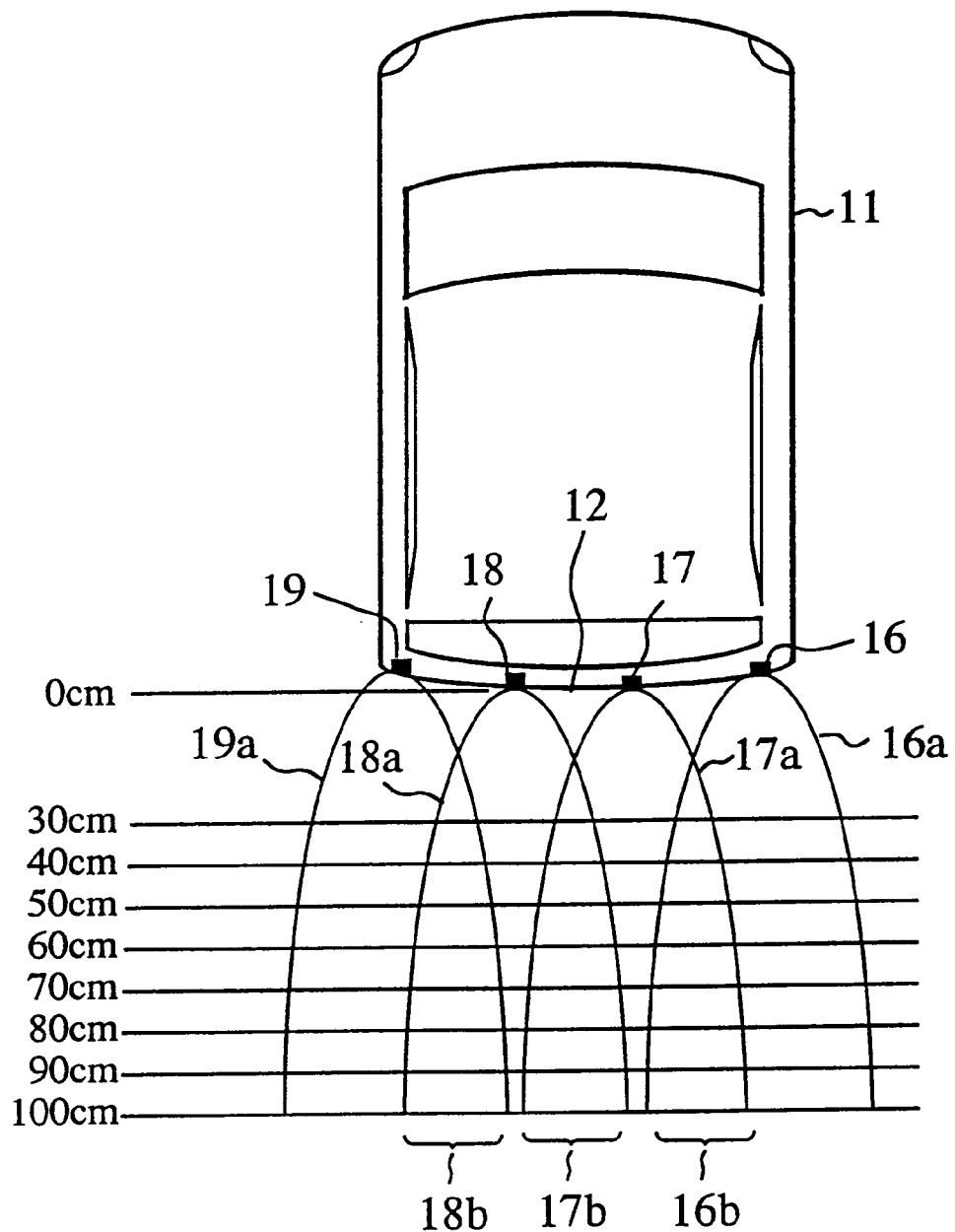
FIG. 1 is a diagram showing an arrangement and a sensing range of ultrasonic wave transmitter/receiver means forming the obstruction detection apparatus according to the first embodiment of the present invention.

In FIG. 1, the reference number 11 designates a vehicle such as an automobile, the reference number 12 denotes a rear bumper of the vehicle 11, and the reference numbers 16 to 19 indicate a plurality of ultrasonic wave transmitter/receiver means installed at the rear bumper 12 of the vehicle 11, for example. Each of the ultrasonic wave transmitter/receiver means 16 to 19 transmits a ultrasonic wave having each of sensing range 16a to 19a and receives a reflected wave from an obstruction and other objects. For example, each ultrasonic wave transmitter/receiver means comprises an ultrasonic wave sensor, a vehicle corners sensor, or a vehicle back sensor or other sensors. The reference numbers 16b to 18b designate sensing ranges or areas where each of the ultrasonic wave transmitter/receiver means 16 to 19 installed at adjacent points to each other receives the reflected wave of the ultrasonic wave that is transmitted from different ultrasonic transmitter/receiver means. Each of the reference characters, for example, 30 cm, 40 cm, . . . , and 100 cm, indicates a distance from the rear bumper section 12 to an obstruction.

Figure 2:
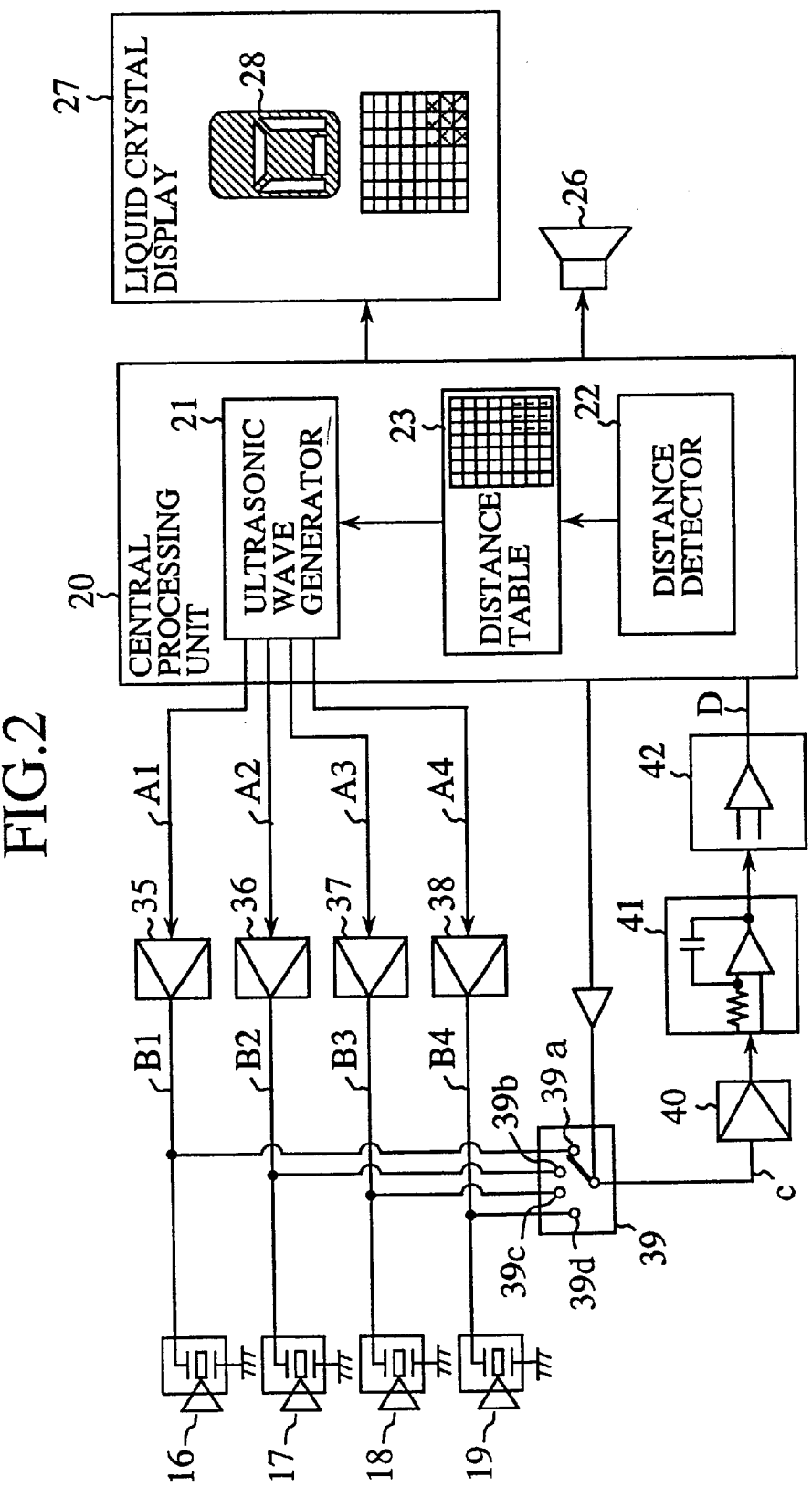
FIG. 2 is a block diagram showing a configuration of the obstruction detection apparatus according to the first embodiment of the present invention.

FIG. 2 is a block diagram showing a configuration of the obstruction detection apparatus according, to the first embodiment of the present invention. In FIG. 2, the reference number 20 designates a central processing unit (CPU) as control means for controlling the entire operation of the obstruction detection apparatus. The reference number 21 denotes an ultrasonic wave generator, the reference number 23 indicates a distance table comprising a plurality of storing fields into which data corresponding to distance signals calculated by and outputted from the distance detection means 22 are stored. In a concrete example, the distance table 23 comprises a memory such as a dynamic random access memory (DRAM), for example. The control means 20 comprises the ultrasonic wave generator 21, the distance detection means 22, and the distance table 23. The reference number 26 designates a buzzer that sounds an alarm for the driver when the vehicle is moving toward near the obstruction. Thereby, the driver in the vehicle 11 can recognize that the vehicle 11 is near the obstruction. The reference number 27 denotes a Liquid Crystal (LC) display for displaying the position of the obstruction.

Figure 3:
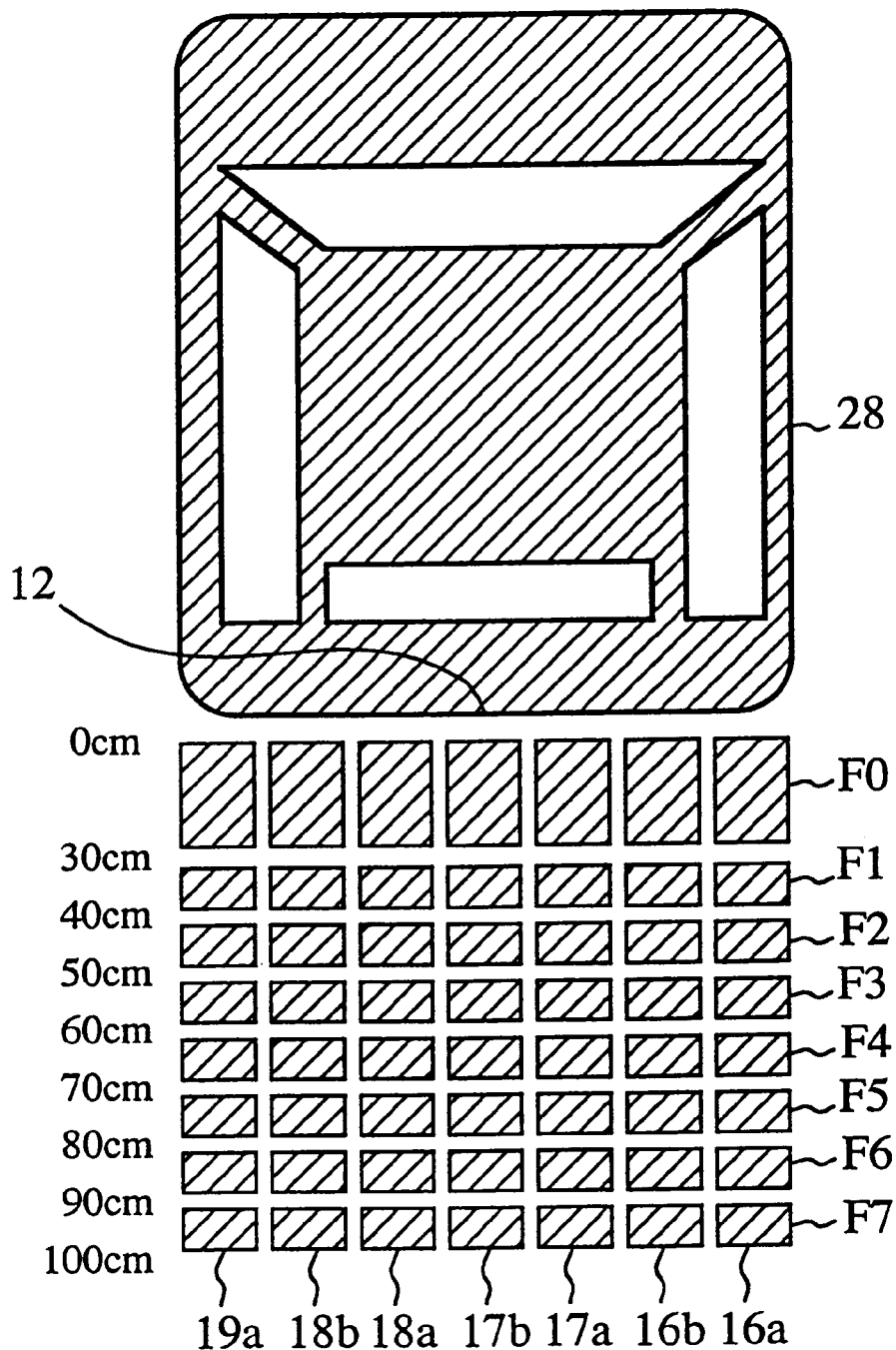
FIG. 3 is a diagram showing the state in which all of display bars as display segments on a display device incorporated in the obstruction detection apparatus light up, as shown in FIG. 2.

FIG. 3 is a diagram showing the state in which all of display bars or bar sections having a lattice shape on the display device 27 incorporated in the obstruction detection apparatus light up, as shown in FIG. 2. As shown by the slant lines in FIG. 3, all of the display bars on the display device 27 light up. After the rear bumper 12 of the vehicle shaped FIG. 28 shown in FIG. 3, the display bars F0 to F7 of a lattice shape, are sequentially arranged.

Figure 4:
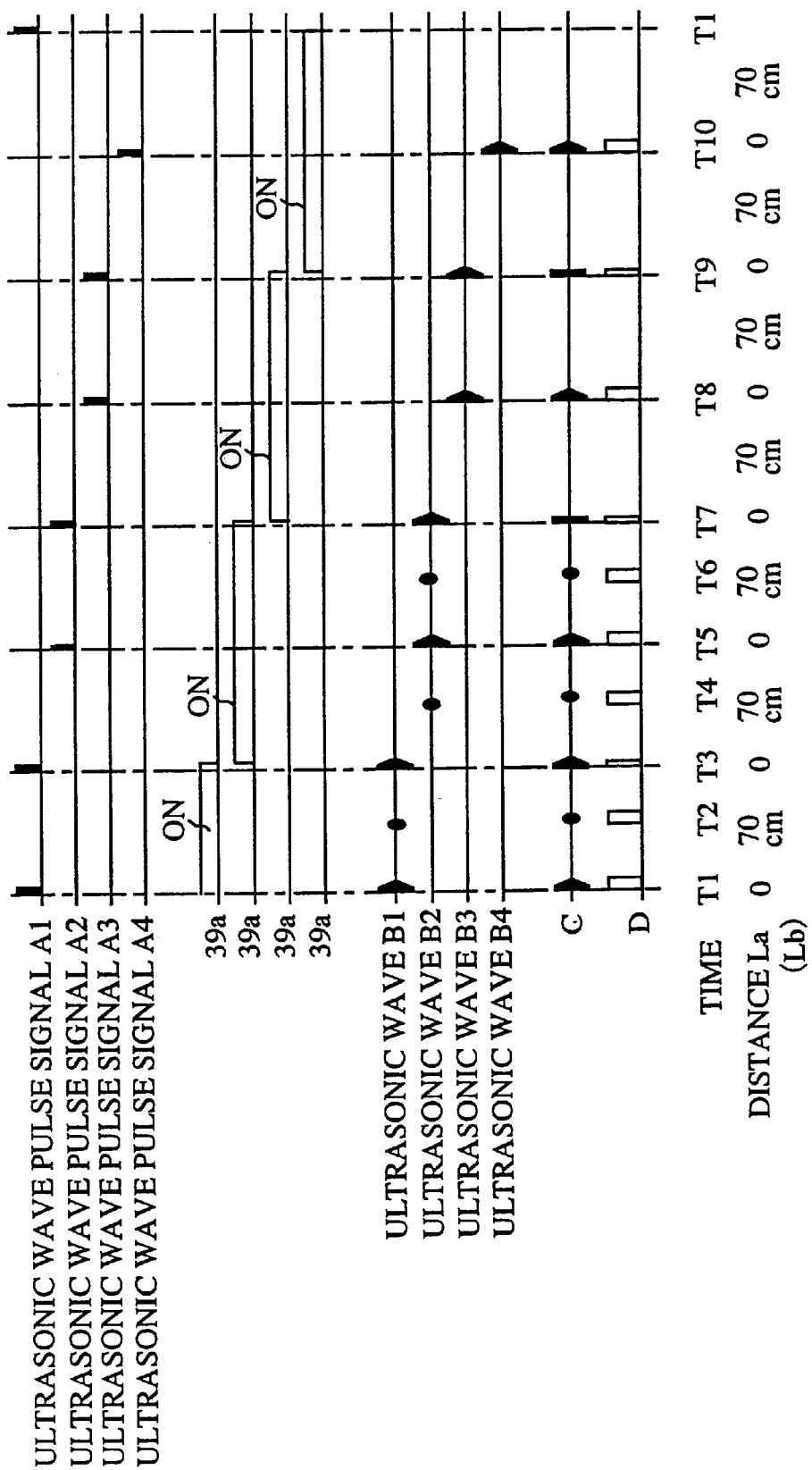
FIG. 4 is a timing chart showing changes of ultrasonic wave pulse signals transferred from the obstacle detection apparatus of the first embodiment.

FIG. 4 is a timing chart showing changes of ultrasonic wave pulse signals transferred from the obstacle detection apparatus 16 to 19 according to the first embodiment. As shown in FIG. 4, the ultrasonic wave pulse signals A1 to A4 generated by the ultrasonic wave generator 21 are converted to ultrasonic waves B1 to B4 by using alternative current and amplified them by amplifiers. Then, the ultrasonic waves B1 to B4 are transferred to the ultrasonic wave transmitter/generator means 16 to 19 installed at the rear bumper section 12. The reference numbers 35 to 38 denote the amplifiers for converting the ultrasonic wave pulse signals A1 to A4 transferred from the ultrasonic wave generator 21 to alternative currents, for amplifying them, and for outputting the obtained amplified ultrasonic wave B1 to B4 to the ultrasonic wave transmitter/receiver means 16 to 19. The reference number 39 denotes a switching means comprising electrical contacts 39a to 39d for switching the connections between the ultrasonic wave transmitter/receiver means 16 to 19 and the amplifiers 36 to 38 under the control of the CPU 20. The reference number 40 indicates an amplifier, the reference number 41 designates a band pass filter for passing only a ultrasonic wave component having a predetermined frequency band, and the reference number 42 denotes a detector for converting the ultrasonic wave from the band pass filter 41 into a pulse signal D.

Next, a description will be given of the operation of the obstruction detection apparatus of the first embodiment according to the present invention.

Figure 5:
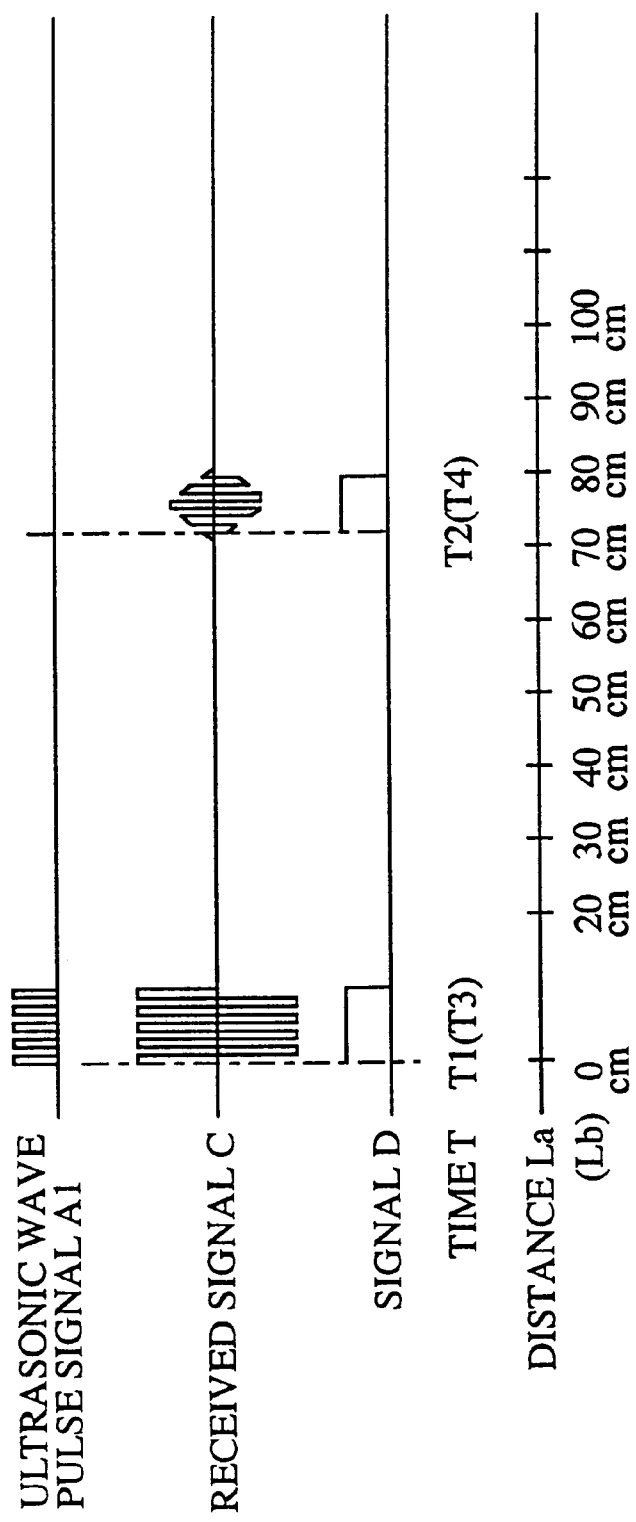
FIG. 5 is a diagram showing the relationship of a pulse signal, a received signal, a vehicle, and an obstruction.
Figure 6:
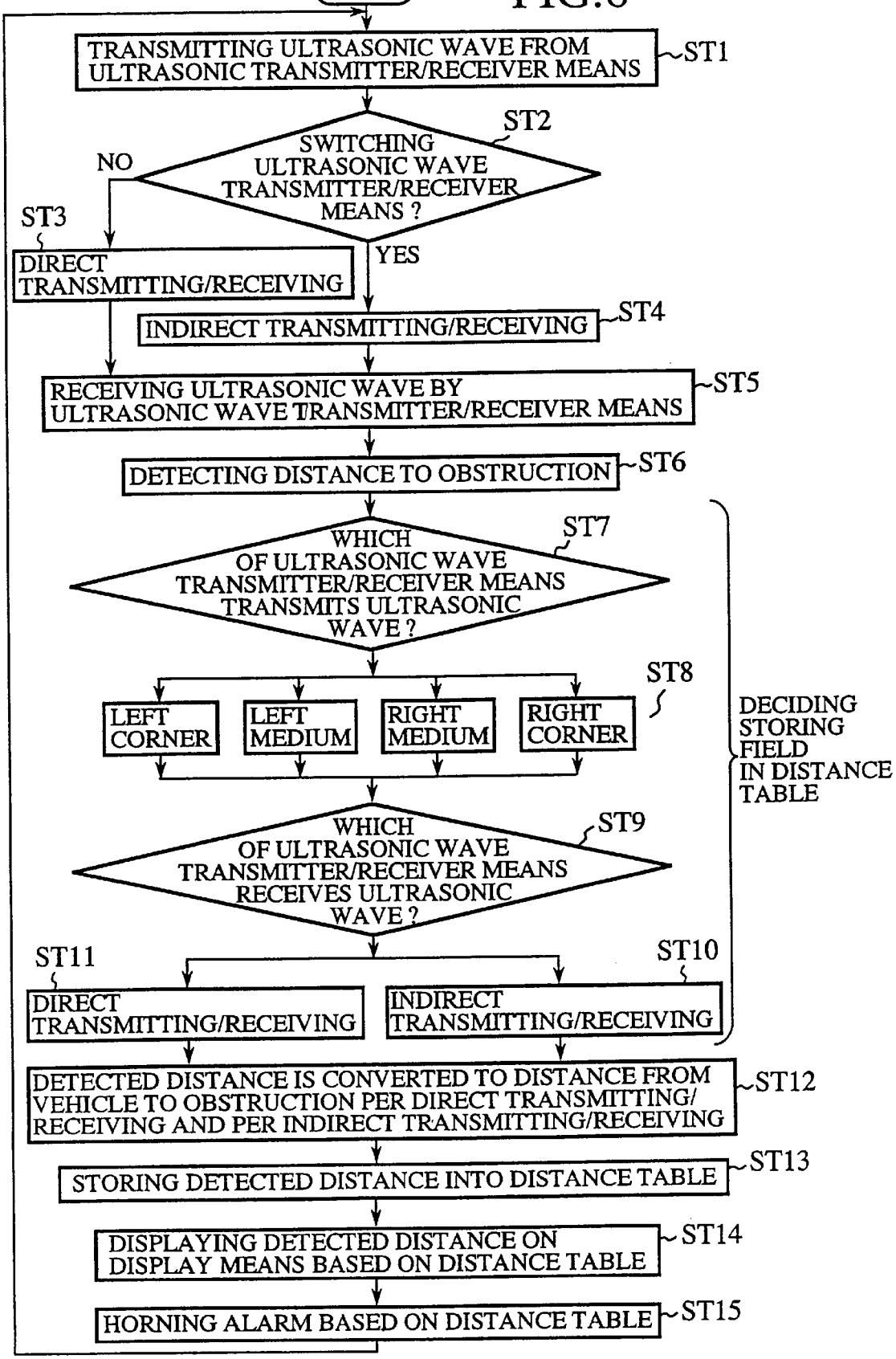
FIG. 6 is a flow chart of the operation of the obstruction detection apparatus according to the first embodiment.

FIG. 5 is a diagram showing the relationship of the ultrasonic wave pulse signal A1, the received signal C, the vehicle 11, and the obstruction. FIG. 6 is a flow chart of the operation of the obstruction detection apparatus of the first embodiment. Hereinafter, the operation of the obstruction detection method will be explained with reference to FIGS. 1 to 6.

For example, the ultrasonic wave generator 21 incorporated in the CPU 20 generates and outputs the ultrasonic wave pulse signal A1. The amplifier 35 converts this pulse signal A1 to an alternative current and amplifies the alternative current. Then, the ultrasonic wave transmitter/receiver means 16 installed at the right corner section in the rear bumper section 12 outputs the ultrasonic wave B1 to outside of the vehicle 11 according to the amplifier alternative current. (Step ST1)

The ultrasonic wave B1 irradiated from the ultrasonic wave transmitter/receiver means 16 in the vehicle 11 travels rearward. When there is an obstruction around the vehicle 11, the ultrasonic wave B1 returns to the vehicle 11 because the ultrasonic wave B1 is reflected by the obstruction. Then, the ultrasonic wave transmitter/receiver means 16 receives the reflected ultrasonic wave B1. (Step ST5)

As shown in FIG. 5, at the timing T1, the ultrasonic wave generator 21 transmits the ultrasonic wave pulse signal A1 and the ultrasonic wave transmitter/receiver means 16 transmits the ultrasonic wave B1 toward outside of the vehicle 11. At the timing T2, the ultrasonic wave transmitter/receiver means 16 receives the received signal C. The detection time, namely the time interval from the transmission of the ultrasonic wave B1 to the receiving of the received signal C, becomes the time interval (T2–T1) that is shorter than a predetermined time interval.

The received signal C received by the ultrasonic wave transmitter/receiver means 16 as the ultrasonic wave B1 reflected by the obstruction is transferred to the amplifier 40 through the switching means 39, and passed through the amplifier 40 and the band pass filter 41 and then converted by the detector 42 into the pulse signal D. The distance detection means 22 in the CPU 20 calculates the distance La from the ultrasonic wave transmitter/receiver means 16 installed at the rear bumper section 12 in the vehicle 11 to the obstruction according to the time interval (T2–T1) by using following equations (1) and (2). (Step ST6)

Thus, we will call the ultrasonic wave transmitting and receiving operation as the direct transmitting and receiving process, or the direct transmitting and receiving in short when the ultrasonic wave transmitter/receiver means 16 transmits a ultrasonic wave and directly receives a received signal C.

$$La = V(T2 - T1) \tag{1}$$

$$V = 331.45 + 0.607t \tag{2},$$

where V is a propagation velocity of a ultrasonic wave in air.

Figure 10:
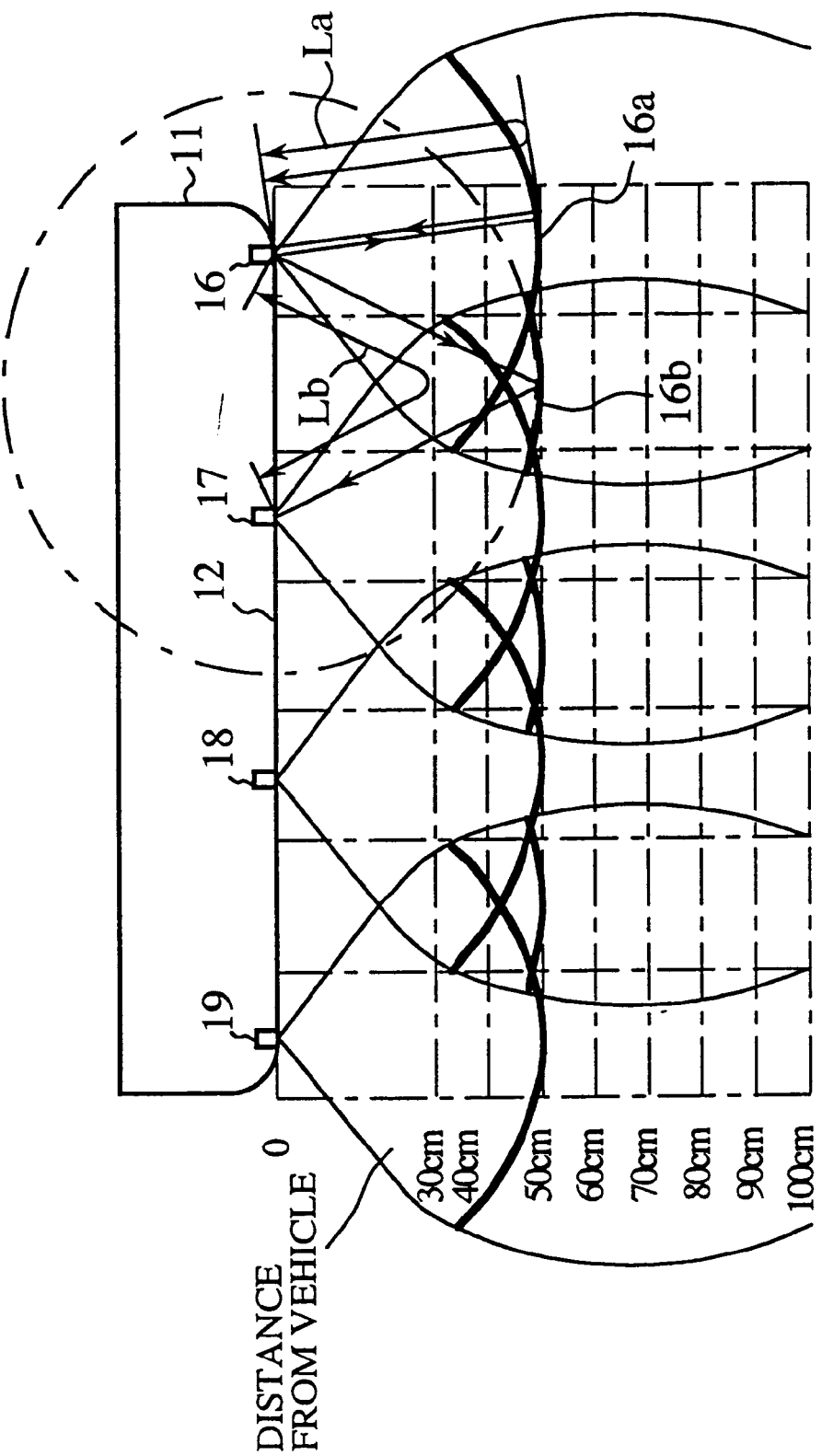
FIG. 10 is a diagram showing the principle of the detection method of a distance performed by the obstruction detection apparatus according to the first embodiment.

FIG. 10 is a diagram showing the principle of the distance detection process performed by the obstruction detection apparatus of the first embodiment.

The distance La detected by the ultrasonic wave transmitter/receiver means 16 in the direct ultrasonic transmitting/receiving process may be explained by using a circle arc indicated by the reference character 16a shown in FIG. 10. In this case, the distance from the vehicle 11 to the obstruction is a half value of the distance La.

Next, as shown in both FIG. 4 and FIG. 5, the ultrasonic wave generator 21 generates and outputs the ultrasonic wave pulse signal A1 at the timing T3, and then the ultrasonic wave transmitter/receiver means 16 transmits the ultrasonic wave B1 at the timing T3. After the transmission of the ultrasonic wave B1, the electrical contact 39a in the switching means 39 is switched to the electrical contact 39b under the control of the CPU 20. (Step ST20)

Thereby, the ultrasonic wave transmitter/receiver means 17 receives the ultrasonic wave reflected by the obstruction. At the timing T4, the detector 42 detects the received signal C. Thus, similarly to the case of the ultrasonic wave B1, the ultrasonic wave B2 received by the ultrasonic wave transmitter/receiver means 17 is converted to the pulse signal D by the detector 42 after through the amplifier 40 and the band pass filter 41. The distance detection means 22 in the CPU 20 detects the distance Lb from the ultrasonic wave transmitter/receiver means 16 to the ultrasonic wave transmitter/receiver means 17 installed at the center of the right corner section in the rear bumper 12 through the obstruction based on the time interval (T4–T3) from the timing T4 after the timing T3 to the timing to receive the received signal C by using the following equation (3). Thus, we will call the case in which the ultrasonic wave transmitter/receiver means 16 receives the ultrasonic wave B1 and the ultrasonic wave transmitter/receiver means 17 receives the received signal C as an indirect transmitting and receiving operation.

Figures 11, 13:
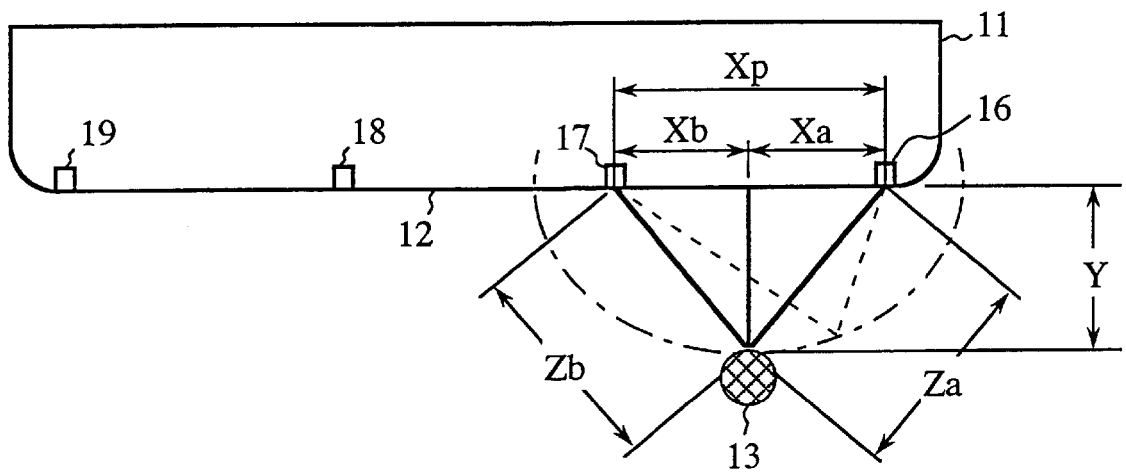
FIG. 11 is a diagram showing a detailed indirect transmission/receiving method in the distance detection process shown in FIG. 10.
FIG. 13 is a diagram showing the distance table storing data incorporated in the obstruction detection apparatus according to the second embodiment of the present invention.

FIG. 11 is a diagram showing the detailed indirect transmission/receiving process in the distance detection shown in FIG. 10. When the ultrasonic wave transmitter/receiver means 16 transmits an ultrasonic wave and the ultrasonic wave transmitter/receiver means 17 receives the ultrasonic wave reflected from an obstruction, namely, in the indirect transmitting/receiving operation, the detected distance Lb may be shown by the circle arc designated by the reference character 16b shown in FIG. 10. The minimum distance from the vehicle 11 may be shown by the vertical distance Y (or the sensing distance) and may be also calculated by the following equations (3) and (4):

$$Lb = V(T4 - T3) \quad (3);$$

$$Xa^2 + Y^2 = Za^2 \quad (4);$$

$$Xb^2 + Y^2 = Zb^2 \quad (5);$$

Distance between both ultrasonic wave transmitter/receiver means:

$$Xp = Xa + Xb \quad (6);$$

and

Distance obtained is the indirect transmitting/receiving process:

$$Lb = Za + Zb \quad (7).$$

As shown in FIG. 11, the maximum value of the vertical distance Y from the vehicle 11 is obtained at the intermediate point between the ultrasonic wave transmitter/receiver means 16 and 17. In this case, the sensing distance Y requires the following condition (8):

$$Xa = Xb, Za = Zb \quad (8).$$

That is, the sensing distance Y may be obtained by the following equation (9):

$$Y = (Lb^2 - (Xp/2)^2)^{1/2} \quad (9).$$

FIG. 7 is a diagram showing a configuration of the distance table 23 in the CPU 20 in the obstruction detection apparatus of the first embodiment.

The obstruction detection apparatus of the first embodiment calculates both the detection distances La and Lb (Step ST12) to the obstruction from the vehicle 11 according to the direct and indirect transmitting/receiving processes by using the ultrasonic wave transmitter/receiver means 16 to 19 for transmitting and receiving ultrasonic wave (Step St7 to Step ST11), and converts the sensing distances L and Y. Both the converted sensing distances L and Y from the vehicle 11 to the obstruction are stored into each memory field in the distance table 23. As shown in FIG. 7, the memory fields in the distance table 23 are divided into vertical memory fields forming memory fields, a field of 0–30 cm, a display bar as a field 30–40 cm, a display bar as a field 40–50 cm, . . . , and a display bat as a field 90–100 cm, each per 10 cm. The memory fields in the distance table 23 are also classified in lattice per ultrasonic wave transmitter/receiver means, per direct transmission/receiving process, and per indirect transmission/receiving process.

Figure 12:
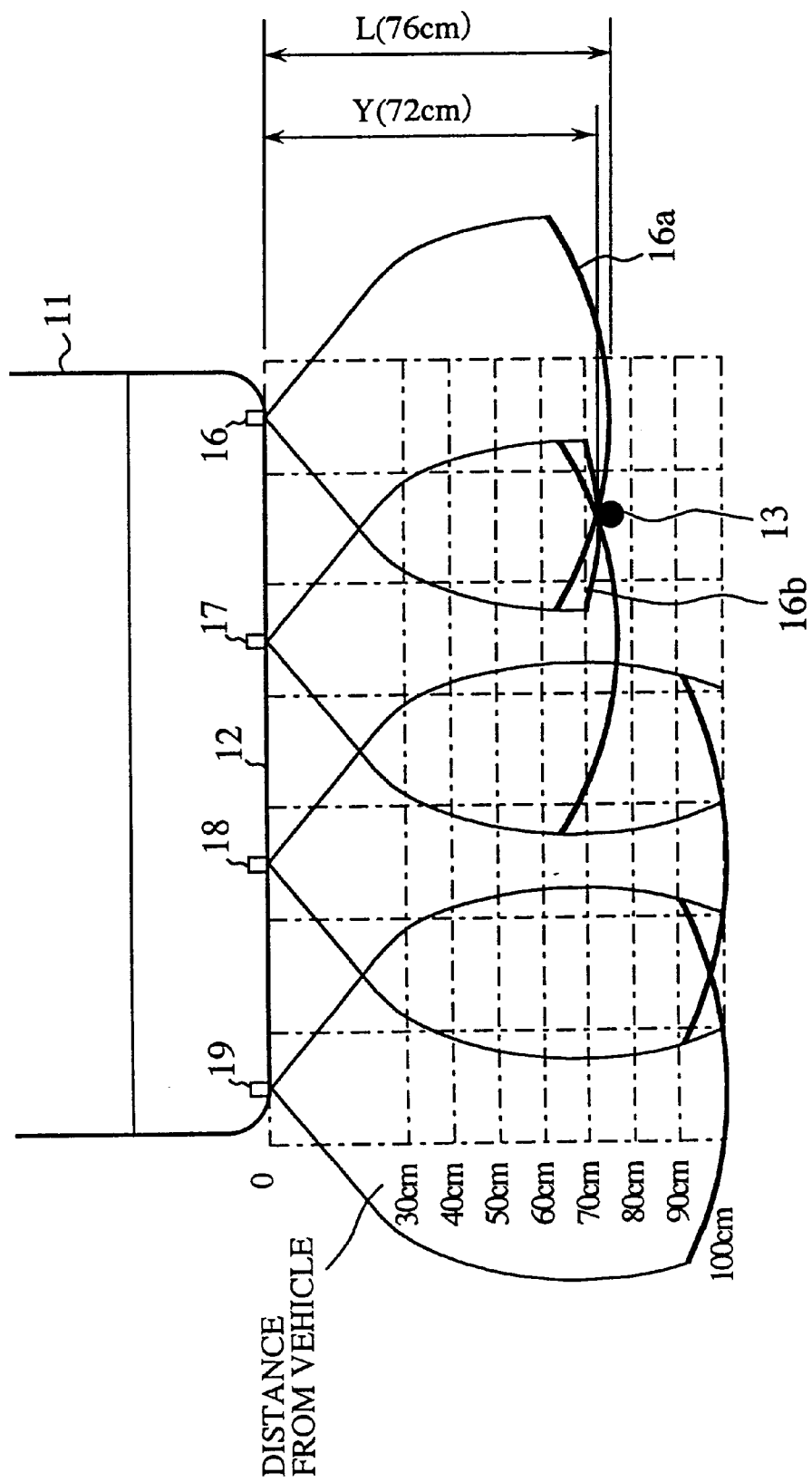
FIG. 12 is a concrete example of a direct transmitting/receiving process and an indirect transmitting/receiving process in the distance detection process shown in FIG. 10.

FIG. 12 is a concrete example of the direct transmitting/receiving process and the indirect transmitting/receiving process in the distance detection shown in FIG. 10. As shown in FIG. 12, when there is an obstruction between the ultrasonic wave transmitter/receiver means 16 and 17 and in the distance of 72 cm from the vehicle 11, the distance to the obstruction 13 is detected by using both the ultrasonic wave transmitter/receiver means 16 and 17 under the direct transmitting/receiving method and the indirect transmitting/receiving method, and the sensing distances L and Y are calculated. In this case, the sensing distance L becomes 76 cm and the sensing distance Y becomes 72 cm.

Next, how to store data into the distance table 23 will be explained. Since the calculated sensing distances L and Y are in the range of the 70 cm to 80 cm, as shown in FIG. 8, the value "1" is stored into the three fields F5 corresponding to the ranges of 16a, 16b, and 17a that also correspond to the ultrasonic wave transmitter/receiver means 16 and 17. (Step ST13).

Figure 9:
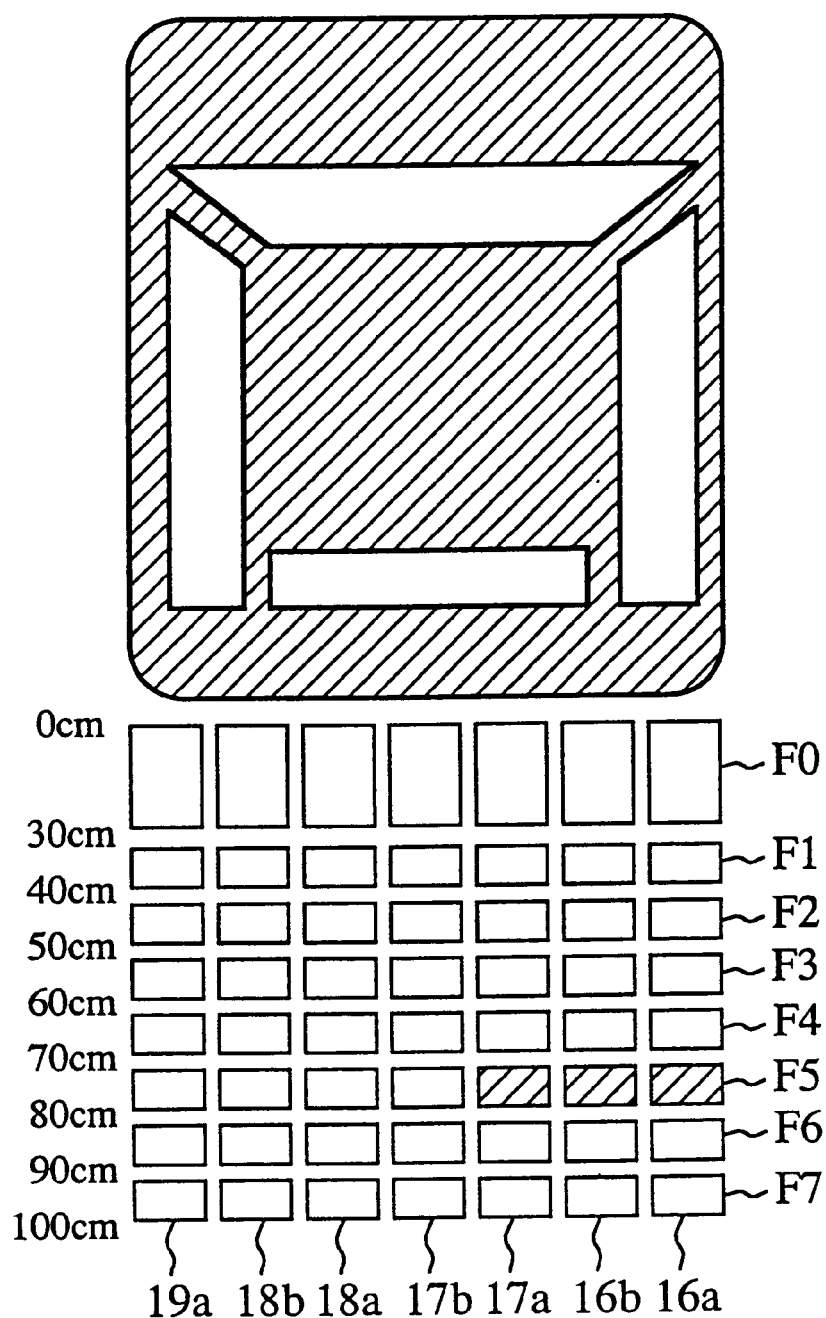
FIG. 9 is a diagram showing a display example on the display device corresponding to the data stored in the distance table shown in FIG. 8.

FIG. 8 is a diagram showing the distance table 23 in which data "1" have been stored and FIG. 9 is a diagram showing a display example of the display device 27 corresponding to the data stored in the distance table shown in FIG. 8.

The LC display 27 lights the display bars, indicated by slant lines shown in FIG. 9, corresponding to the memory fields 16a-F5, 16b-F5, and 17a-F5 based on the data stored in the distance table 23. (Step ST14).

In addition to this, the buzzer 26 sounds an alarm under the instruction from the CPU 20. The period of the alarm of the buzzer 27 is increased according to the distance to the obstruction, namely, corresponding to the magnitude of the distance between the vehicle 11 and the obstruction 13. When the sensing distance enters the range 0 to 30 cm, the buzzer 27 continuously sounds (Step ST15) the alarm in order to inform the degree of occurrence of an dangerous to the driver in the vehicle 11 correctly.

Thus, the series of the following operations are switched by the obstruction detection apparatus in order:

The transmitting/receiving operation of the ultrasonic wave transmitter/receiver means 16→The transmitting operation of the ultrasonic wave transmitter/receiver means 16→the receiving operation of the ultrasonic wave transmitter/receiver means 17→the transmitting/receiving operation of the ultrasonic wave transmitter/receiver means 17→the transmitting operation of the ultrasonic wave transmitter/receiver means 17→the receiving operation of the ultrasonic wave transmitter/receiver means 18→the transmitting/receiving operation of the ultrasonic wave transmitter/receiver means 18→the transmitting operation of the ultrasonic wave transmitter/receiver means 18→the transmitting/receiving operation of the ultrasonic wave transmitter/receiver means 19→the transmitting/receiving operation of the ultrasonic wave transmitter/receiver means 16.

As described above, the obstruction detection apparatus according to the first embodiment detects the distance to the obstruction by the ultrasonic wave transmitter/receiving means 16 to 19, stores data into the memory fields in the distance table 23 according to the detected distance, displays the data stored in the distance table 23 on the LC display, and informs the degree of the dangerous according to the data stored in the distance table 23 through the buzzer 26 to the driver. Thereby, the driver can recognizes the position of the obstruction measured from the vehicle 11. In the example explained in the first embodiment, the shape of each display bar forming the LC display device 27 is a lattice shape. However, the present invention is not limited by this example, for example, it is acceptable to form each display bar on the LC display device 27 with a circular shape, a polygon shape, or other shape. This causes to have the same effect. In addition, it is also acceptable to use a display device incorporated in a navigation apparatus, or a car television set or other display devices as the LC display device 27. This case also causes to have the same effect. In the navigation apparatus, it is acceptable to switch the display of the navigation apparatus or the TV set for an obstruction when the vehicle moves rearward or when a switch is switched by the driver, or when the obstruction detection apparatus detects an obstruction. Furthermore, the period of the alarm of the buzzer 26 is changed according to the distance to the obstruction in the explanation of the first embodiment described above, it is also acceptable to change the frequency of or the magnitude of the sound of the buzzer 26 according to the sensing distance in order to inform the dangerous to the driver. This can also obtain the same effect.

Second Embodiment

Figure 14:
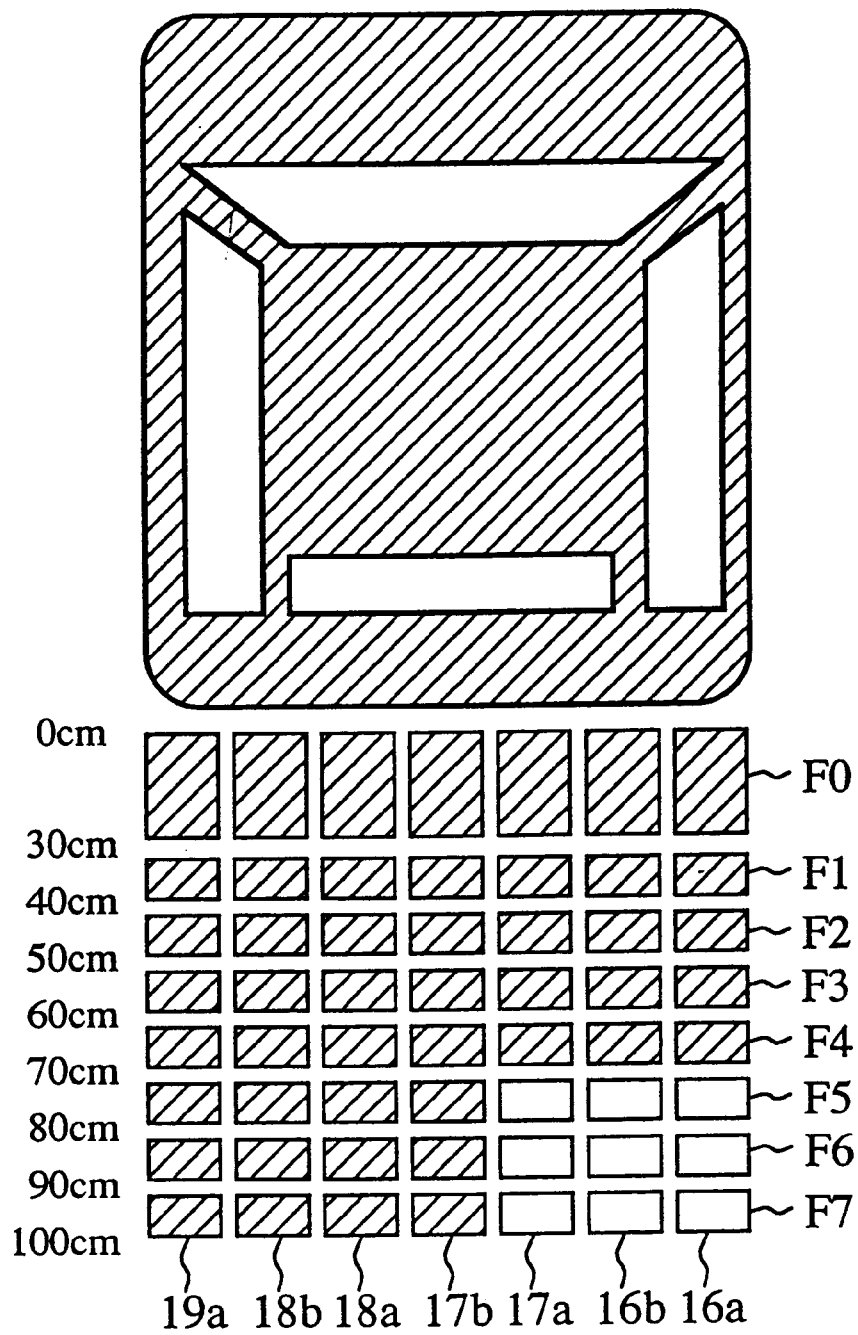
FIG. 14 is a diagram showing a display example of the LC display device corresponding data stored in the distance table shown in FIG. 13.

FIG. 13 is a diagram showing the distance table storing data incorporated in the obstruction detection apparatus according to the second embodiment of the present invention. FIG. 14 is a diagram showing a display example on the LC display device 27 based on corresponding data stored in the distance table shown in FIG. 13. Other components in the obstruction detection apparatus of the second embodiment are the same of the components in the obstruction detection apparatus of the first embodiment, the same reference numbers are thereby used for the same components, and the explanation of them is omitted here for brevity.

Next, a description will be explained for the operation of the obstruction detection apparatus of the second embodiment.

In the obstruction detection apparatus of the first embodiment shown in FIGS. 1 to 12, the display bars as the display sections on the display device 27 corresponding to the data stored in the memory fields in the distance table 23 light up with black symbol or black blinking (indicated by the slant lines shown in Figures). On the contrary, in the second embodiment, when an obstruction 13 is detected at the position indicated by the reference symbol "●" shown in FIG. 12, the data value "1" is stored into the memory fields in the distance table 23 corresponding to the range of positions where no obstruction is detected apparently, as shown in FIG. 13, and the data value "0" is set into the memory fields in the distance table 23 corresponding to the range of positions where the obstruction is detected and corresponding to the range of shadows of the obstruction where it is difficult for the obstruction detection apparatus to detect the obstruction. As a result, the display bars on the display device 27 corresponding to the data value "0" stored in the distance table 23 light up with white symbol or white blinking.

As described above, in the obstruction detection apparatus of the second embodiment, the data value "1" are stored into the memory fields in the distance table 23 corresponding to the range of positions where no obstruction is detected apparently, and the data value "0" is stored into the memory fields in the distance table 23 corresponding to the range of the position where the obstruction 13 is detected and where it is difficult to detect the obstruction. Accordingly, it is possible for the driver of the vehicle 11 to recognize the position of the obstruction correctly and easily, like the obstruction detection apparatus as the first embodiment.

Third Embodiment

Figure 15:
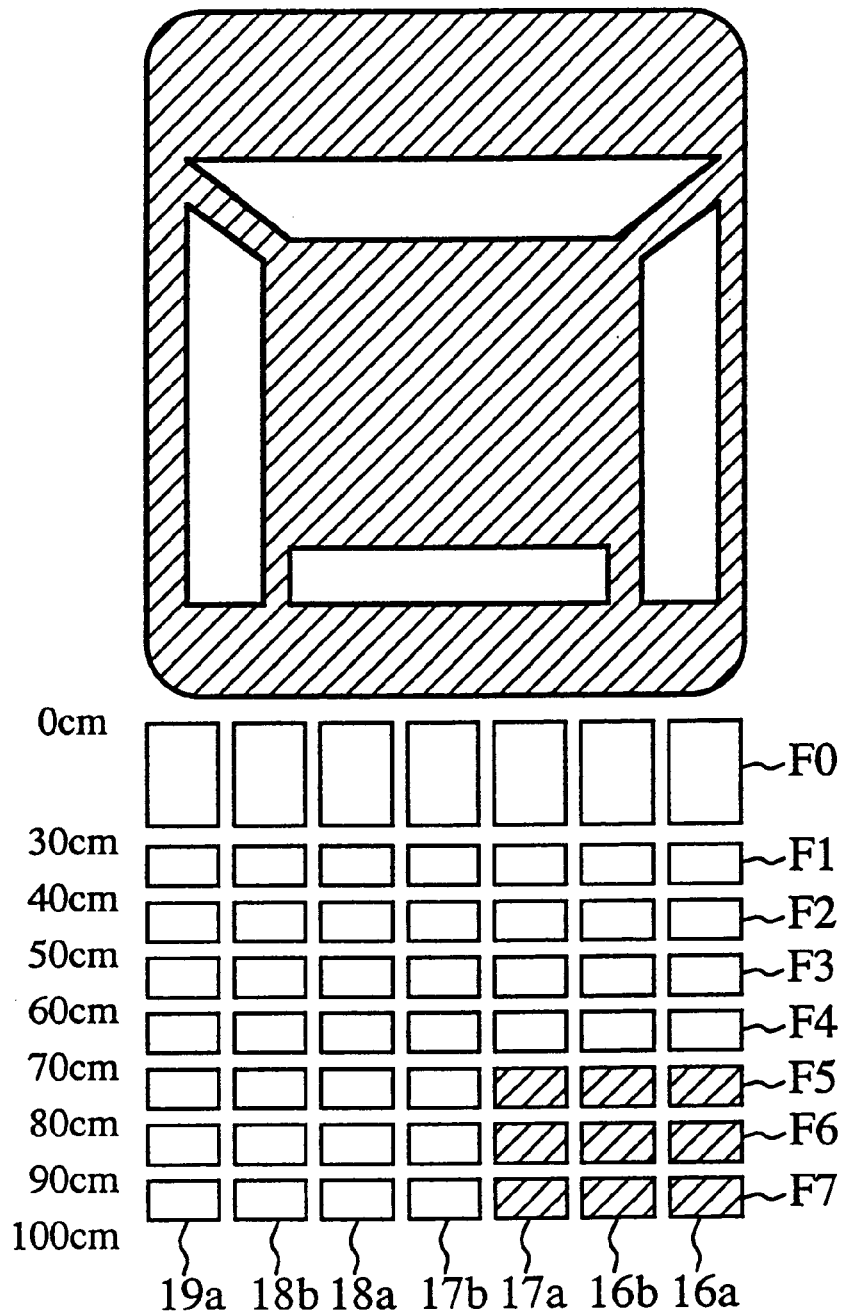
FIG. 15 is a diagram showing a display example on the LC display device incorporated in the obstruction detection apparatus according to the third embodiment.

FIG. 15 is a diagram showing a display example on the LC display device 27 incorporated in the obstruction detection apparatus according to the third embodiment. Other components in the obstruction detection apparatus as the third embodiment are the same of the components in the obstruction detection apparatus of the first embodiment, the same reference numbers are thereby used for the same components, and the explanation of them is omitted here for brevity.

Next, a description will be explained for the operation of the obstruction detection apparatus of the third embodiment.

In the obstruction detection apparatus of the first embodiment shown in FIGS. 1 to 12, the display bars in the display device 27 corresponding to the data stored in the memory fields in the distance table 23 light up with black symbol or black blinking (indicated by the slant lines). However the present invention is not limited by this. When there is the obstruction at the position 13 indicated by the reference symbol "●" shown in FIG. 12, for example, it is acceptable to set the data value "0" into memory field in the distance table 23 that correspond to the range in which no obstruction is detected apparently, and to set the data value "1" into memory fields corresponding to the position of the obstruction and corresponding to the range including the shadow of this obstruction where it is difficult to detect the obstruction. In other words, the values set in the memory fields of the distance table 23 in the third embodiment have the inverted values of the values set in the memory fields in the distance table 23 in the second embodiment. Accordingly, the display pattern on the display device 27 in the third embodiment is reversed when comparing with the display pattern in the second embodiment. Since the display pattern of the display device 27 in the third embodiment has the reversed display pattern of that shown in FIG. 14, the obstruction 13 is displayed by the black symbol on the display device 27.

As described above, according to the obstruction detection apparatus as the third embodiment, the data value "0" is set to the memory field corresponding to the range where no obstruction is detected apparently, and the data value "1" is set into the memory field corresponding to the position of the obstruction in addition to the range including the shadow of the obstruction in which it is difficult to detect the obstruction. It is thereby possible for the driver to recognize correctly the position of the obstruction.

Fourth Embodiment

The first embodiment uses the distance table 23 for the direct transmitting/receiving process. In addition to this configuration, the obstruction detection apparatus as the fourth embodiment further includes memory fields in the distance table 23 for the indirect transmitting/receiving process. The memory fields in the distance table 23 for both the direct and indirect transmitting/receiving processes are same in configuration. Other components in the obstruction detection apparatus of the fourth embodiment are the same of the components in the obstruction detection apparatus of the first embodiment, the same reference numbers are thereby used for the same components, and the explanation of them is omitted here for brevity.

In the obstruction detection apparatus of the fourth embodiment, since the memory fields is added in the distance table 23 for the indirect transmitting/receiving process in addition to the memory fields for the direct transmitting/receiving process used in the first to third embodiments, the resolution of the obstruction detection apparatus becomes (2N−1) when the number of the ultrasonic wave transmitter/receiver means is N (N in an positive integer) because both the distance tables for the direct and indirect transmitting/receiving processes.

As described above, according to the obstruction detection apparatus as the fourth embodiment, since the memory fields corresponding to the indirect transmitting/receiving process is added in the distance table 23 in addition to the memory field corresponding to the direct transmitting/receiving process, it is possible for the driver to recognize the position of the obstruction preciously with a higher resolution even if the number of the ultrasonic wave transmitter/receiver means is smaller.

Fifth Embodiment

Figure 16:
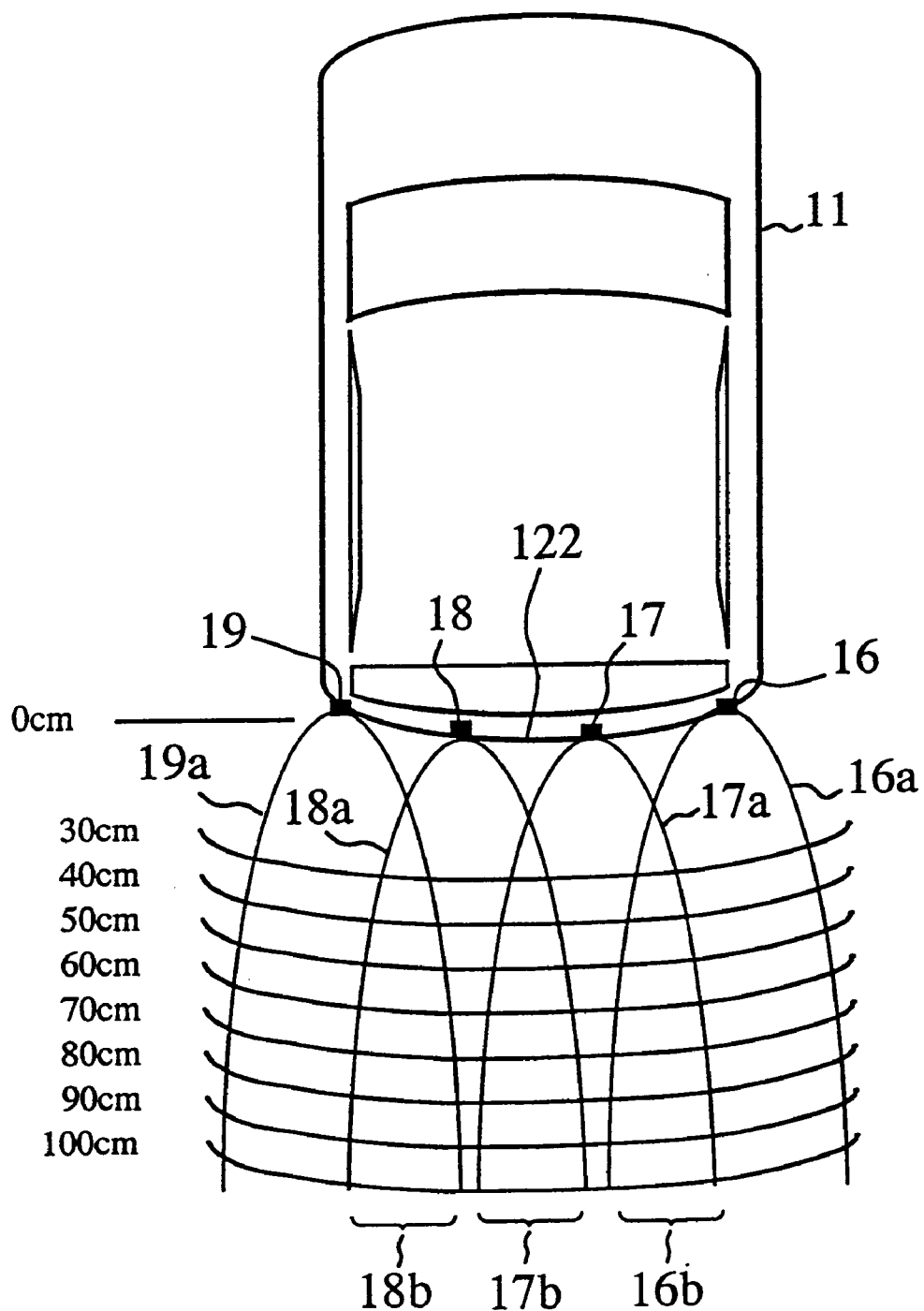
FIG. 16 is a diagram showing an arrangement of ultrasonic wave transmitter/receiver means in the obstruction detection apparatus according to the fifth embodiment of the present invention.

FIG. 16 is a diagram showing an arrangement of ultrasonic wave transmitter/receiver means in the obstruction detection apparatus according to the fifth embodiment of the present invention. In FIG. 16, the reference numbers 16 to 19 designate ultrasonic wave transmitter/receiver means, and the reference number 122 indicates a rear bumper having an curvature. Other components in the obstruction detection apparatus of the fifth embodiment are the same of the components in the obstruction detection apparatus of the first embodiment, the same reference numbers are thereby used for the same components, and the explanation of them is omitted here for brevity.

Next, a description will be explained for the operation of the obstruction detection apparatus of the fifth embodiment.

Although it has been assumed in the explanation of the obstruction detection apparatus according to the first embodiment that the shape of the rear bumper 12 of the vehicle 11 is a linear shape, the shape of an actual rear bumper in each vehicle is generally a curve shape having a predetermined curvature. That is, there is a distance difference between the position of each of the ultrasonic wave transmitter/receiver means 16 to 19 and the tip section 122 of the rear bumper. In the fifth embodiment, when the curvature of the rear bumper is greater, namely, when the curvature is not neglected, detected values detected by the obstruction detection apparatus are added with correction values and then set into the distance table 23.

As described above, in the obstruction detection apparatus of the fifth embodiment, the detected values are added with the correction data and then stored into the memory fields in the distance table 23 according to the distance difference between the position of the tip section of the rear bumper and the position of each of the ultrasonic wave transmitter/receiver means 16 to 19. It is thereby possible to display the position relationship between the obstruction and the rear bumper 122 preciously on the LC display device 27.

Sixth Embodiment

Figure 17:
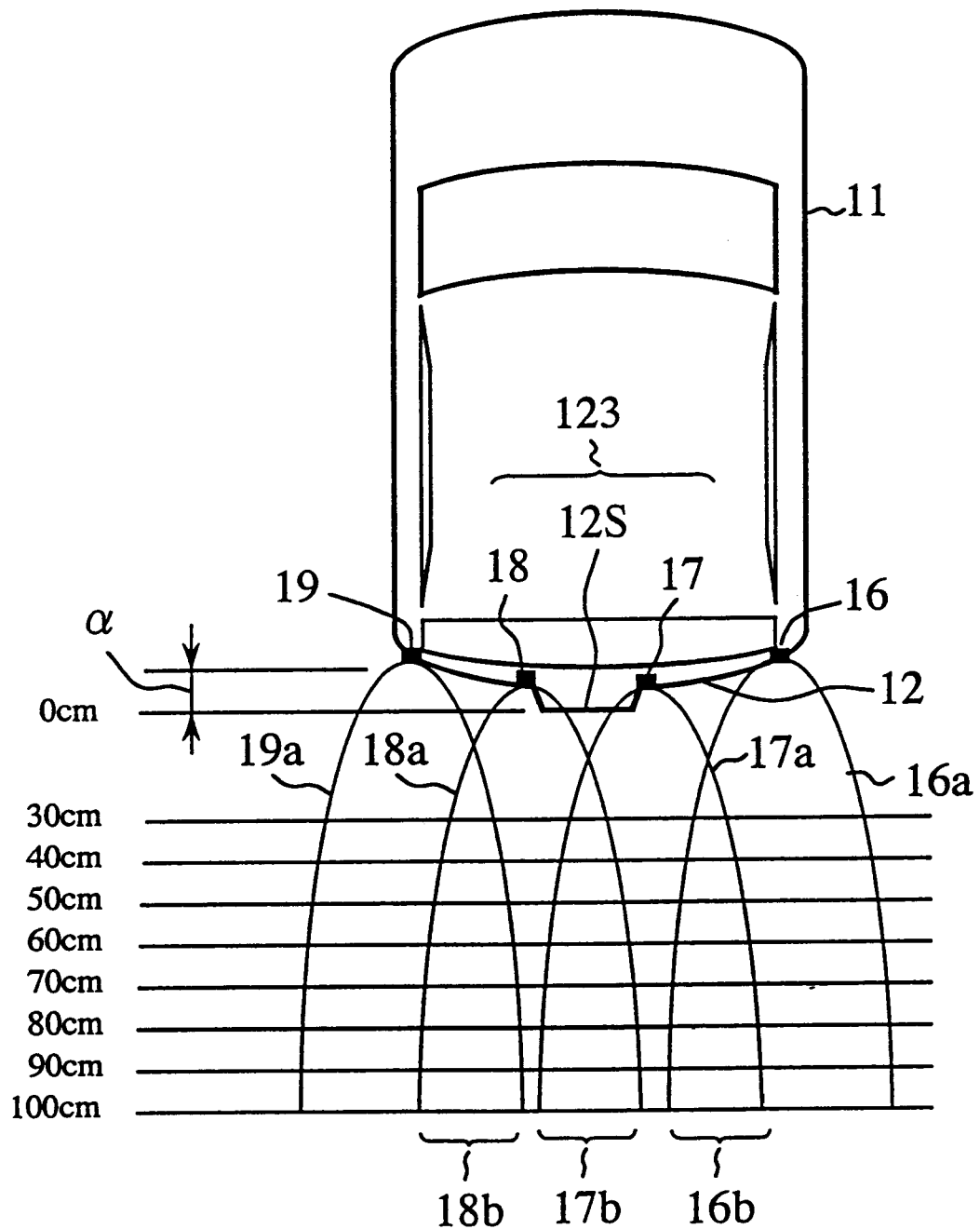
FIG. 17 is a diagram showing an arrangement of ultrasonic wave transmitter/receiver means in the obstruction detection apparatus according to the sixth embodiment of the present invention.

FIG. 17 is a diagram showing an arrangement of ultrasonic wave transmitter/receiver means in the obstruction detection apparatus according to the sixth embodiment of the present invention. In FIG. 17, the reference numbers 16 to 19 designate ultrasonic wave transmitter/receiver means, the reference number 123 indicates a rear bumper having an curvature, and the reference number 12S indicates a projecting part of the rear bumper 123. Other components in the obstruction detection apparatus of the sixth embodiment are the same of the components in the obstruction detection apparatus of the first embodiment, the same reference numbers are thereby used for the same components, and the explanation of them is omitted here for brevity.

Next, a description will be explained for the operation of the obstruction detection apparatus according to the sixth embodiment.

It has been assumed in the explanation of the obstruction detection apparatus according to the first embodiment that the shape of the rear bumper 12 of the vehicle 11 is a linear shape and each ultrasonic wave transmitter/receiver means is installed at the surface of the rear bumper. In an actual rear bumper of a vehicle, as shown in FIG. 17, the rear bumper 123 has a projecting section 12S and each ultrasonic wave transmitter/receiver means is installed at the inner part of the rear bumper 123. That is, there is a distance difference between the projecting section of the vehicle 11 and the point at which each ultrasonic wave transmitter/receiver means 16 to 19 is installed. Therefore, a detected position of the obstruction is stored in addition to correction values into the memory fields in the distance table 23 in order to correct the distance difference.

As described above, in the obstruction detection apparatus according to the sixth embodiment, when there is a distance difference α between the projecting section 12S in the rear bumper 123 and the position of each ultrasonic wave transmitter/receiver means 16 to 19 and when the detected distance of the obstruction is stored into the memory field in the distance table 23, a correction data item corresponding to the distance difference α is added into the detected data, so that the distance between the vehicle 11 and the obstruction is displayed preciously on the LC display device 27.

Seventh Embodiment

The components in the obstruction detection apparatus according to the seventh embodiment are the same of those of the obstruction detection apparatus of the first embodiment, the same reference numbers are therefore used for the same components, and the explanation for them is omitted here for brevity.

Next, a description will be given of the operation of the obstruction detection apparatus according to the seventh embodiment.

Although the data value "1" is stored for the range including a detected position of the obstruction 13 into the memory field in the distance table 23, and the data value "0" is stored into the memory fields corresponding to other position, including the shadow section made by the obstruction, where no obstruction is detected, there is a possibility that other positions includes a position of another obstruction because there is a possibility that another obstruction is in the shadow section of the obstruction. In the seventh embodiment, the data value "1" is also set into the memory fields corresponding to the range including the shadow section of the obstruction.

As described above, according to the obstruction detection apparatus of the seventh embodiment, the data value "1" is also set into the memory fields in the distance table 23 corresponding to the range including the shadow section made by the obstruction. Thereby, it is possible to preciously display the position of the obstruction on the LC display device 27 and to increase the safety in driving.

Eighth Embodiment

Figure 18:
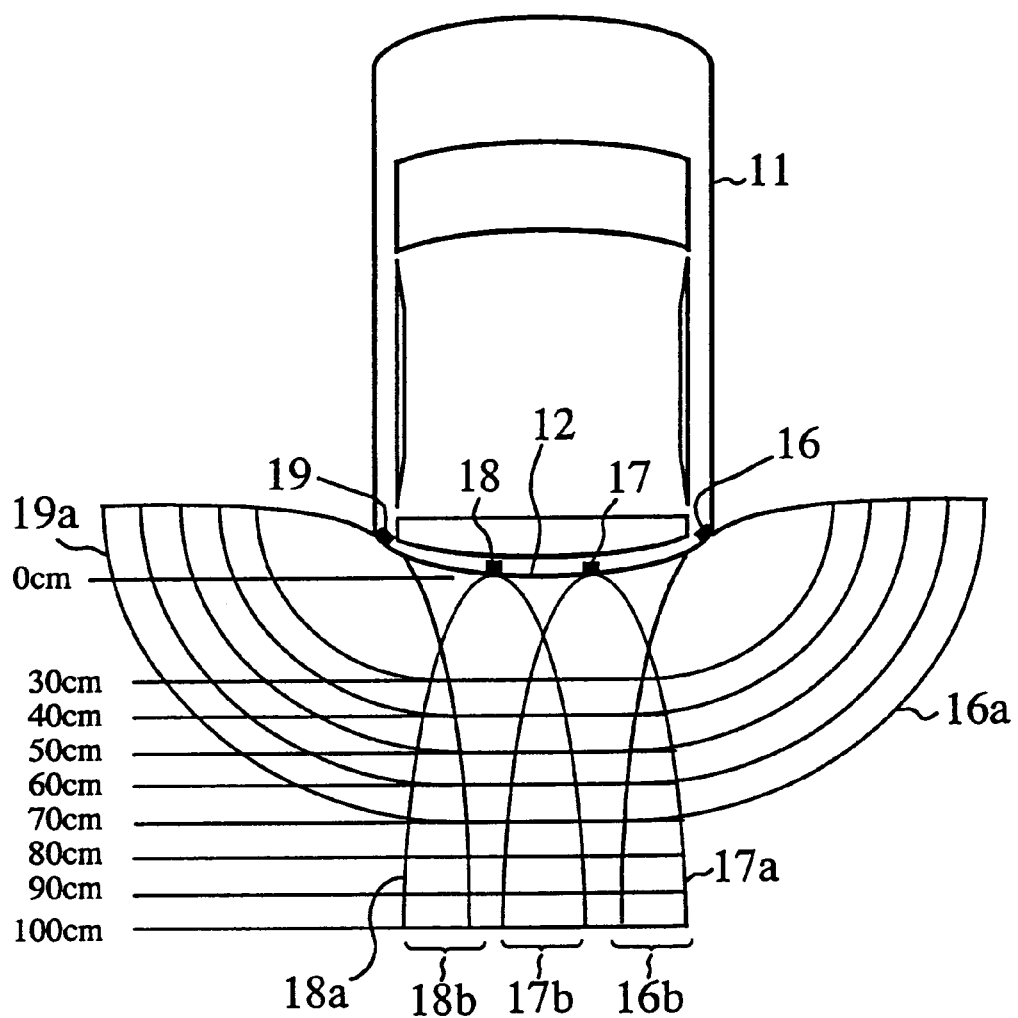
FIG. 18 is a diagram showing an arrangement of ultrasonic wave transmitter/receiver means in the obstruction detection apparatus according to the fifth embodiment of the present invention.
Figure 19:
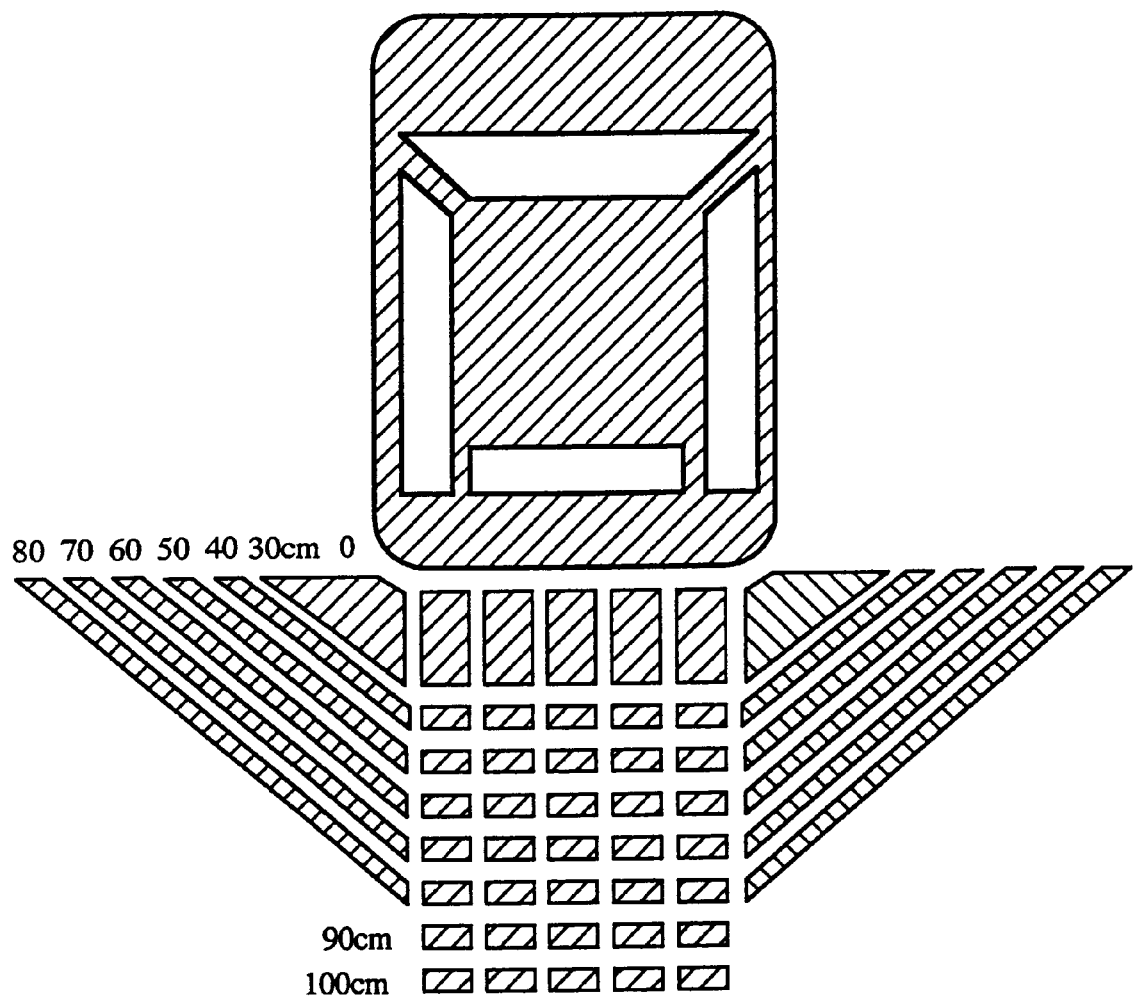
FIG. 19 is a diagram showing a display example on the LC display device in the obstruction detection apparatus shown in FIG. 18, in which all of the display bars as display sections light up.

FIG. 18 is a diagram showing an arrangement of ultrasonic wave transmitter/receiver means in the obstruction detection apparatus according to the eighth embodiment of the present invention. FIG. 19 is a diagram showing a display example on the LC display 27 in the obstruction detection apparatus shown in FIG. 18, in which all display bars light up. Other components in the obstruction detection apparatus according to the eighth embodiment are the same of those of the obstruction detection apparatus of the first embodiment, the same reference numbers are therefore used for the same components, and the explanation for them is omitted here for brevity.

Next, a description will be given of the operation of the obstruction detection apparatus according to the eighth embodiment.

In the obstruction detection apparatus of the first embodiment, all of the ultrasonic wave transmitter/receiver means 16 to 19 are installed at the rear section of the vehicle

11. On the contrary, in the obstruction detection apparatus of the eighth embodiment, two ultrasonic wave transmitter/receiver means 16 and 19 are installed at the rear corner section of the vehicle 11, as shown in FIG. 18. The ultrasonic wave transmitter/receiver means 16 and 19 have a wider sensing range when comparing with the ultrasonic wave transmitter/receiver means 17 and 18, and both the ultrasonic wave transmitter/receiver means 16 and 19 become corners sensors, and the sensing information detected by the ultrasonic wave transmitter/receiver means 16 and 19 is displayed on the LC display device 27 shown in FIG. 1 when receiving the ultrasonic wave in the direct ultrasonic wave receiving operation.

As described above, according to the obstruction detection apparatus of the eighth embodiment, some of the ultrasonic wave transmitter/receiver means 16 to 19 are installed at the rear corner section of the vehicle 11 as corner sensors, it is possible to avoid the installation of any additional corner sensors and it is also possible to detect obstructions around at the corner section of the vehicle.

Ninth Embodiment

Figure 20:
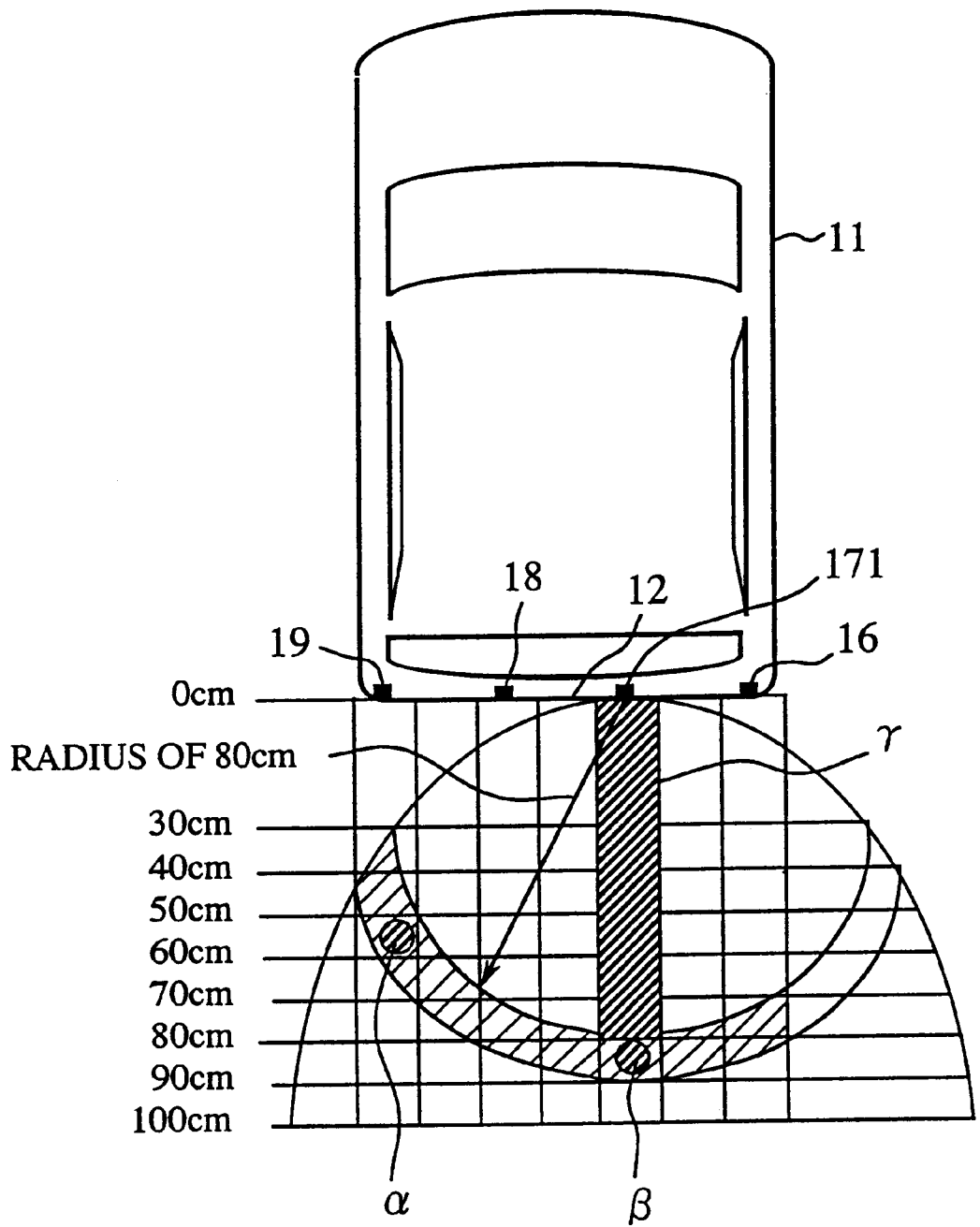
FIG. 20 is a diagram showing an arrangement of ultrasonic wave transmitter/receiver means in the obstruction detection apparatus according to the ninth embodiment of the present invention.
Figure 21:
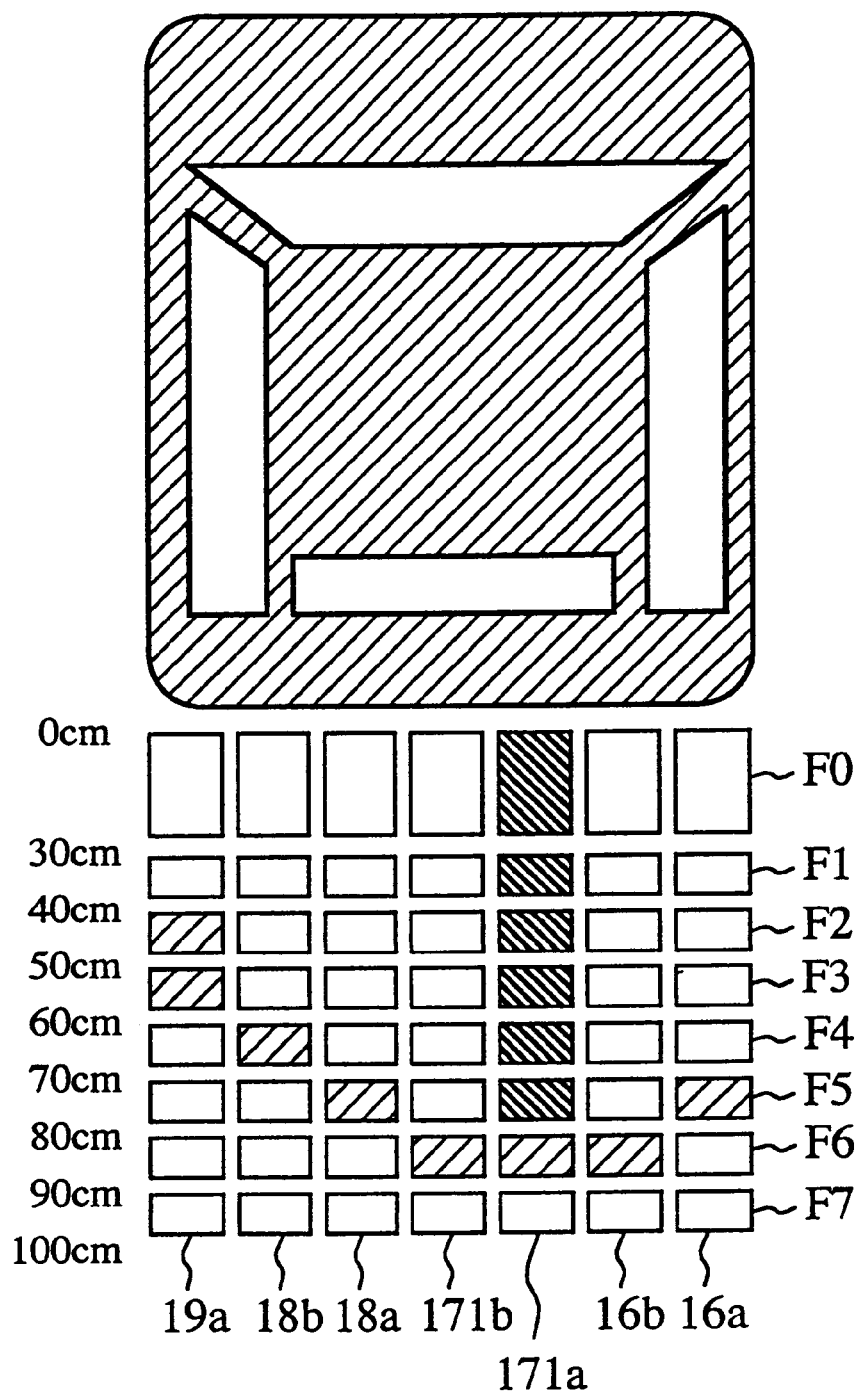
FIG. 21 is a diagram showing a display example on the LC display device in the obstruction detection apparatus shown in FIG. 20.
Figure 22:
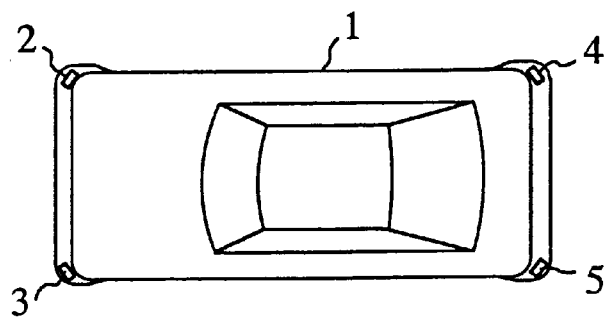
FIG. 22 is a diagram showing a conventional obstruction detection apparatus incorporated in a vehicle.
Figure 23:
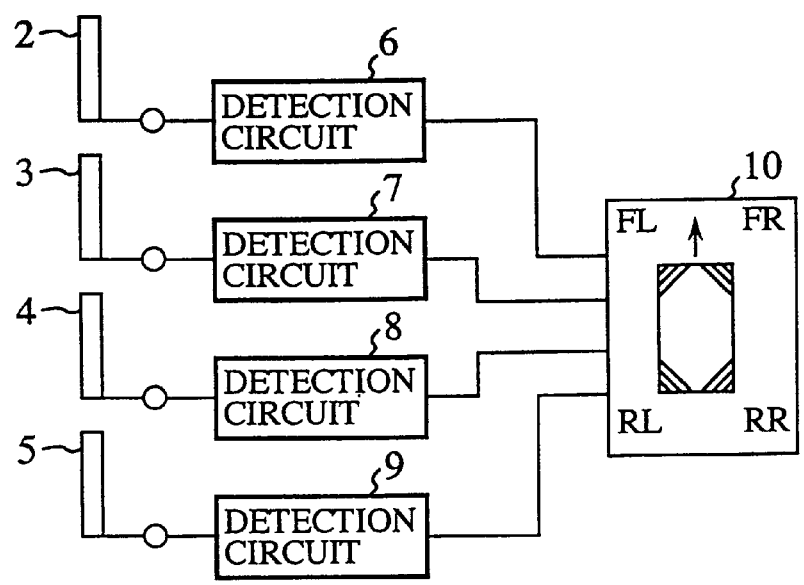
FIG. 23 is a block diagram showing a configuration of the conventional obstruction detection apparatus shown in FIG. 22.

FIG. 20 is a diagram showing an arrangement of the ultrasonic wave transmitter/receiver means in the obstruction detection apparatus according to the ninth embodiment of the present invention. In FIG. 20, the reference numbers 16, 18, and 19 designate ultrasonic wave transmitter/receiver means, the reference number 171 indicates an ultrasonic wave transmitter/receiver means having a sensing range of a wide angle. FIG. 21 is a diagram showing a display example on the LC display device 27 in the obstruction detection apparatus as the shown in FIG. 20. FIG. 20 shows the state in which all of the display bars on the LC display device 27 light up. In FIG. 21, the reference characters 171*a* and 171*b* designate display bars corresponding to memory fields to which data corresponding to the sensing range of the ultrasonic wave transmitter/receiver means 171 are stored during both the direct and indirect transmitting/receiving processes. Other components in the obstruction detection apparatus of the ninth embodiment are the same of the components in the obstruction detection apparatus of the first embodiment, the same reference numbers are thereby used for the same components, and the explanation of them is omitted here for brevity.

Next, a description will be explained for the operation of the obstruction detection apparatus of the ninth embodiment.

In the obstruction detection apparatus of the first embodiment, the ultrasonic wave transmitter/receiver means 16 to 19 having a same function are installed at the rear bumper of the vehicle 11 toward the rear direction of the vehicle 11. In the ninth embodiment shown in FIG. 20, when the ultrasonic wave transmitter/receiver means 171 has a sensing range of a wide angle are installed as the ultrasonic wave transmitter/receiver means (in general, the ultrasonic wave transmitter/receiver means of a wide angle are used widely and commonly) and when there are the obstructions indicated by the reference character α and the reference character β, the ultrasonic wave transmitter/receiver means 171 of the wide angle detects those obstructions α and β as the same position because both the obstructions α and β are in the same radius from the ultrasonic wave transmitter/receiver means 171. That is, it is thereby difficult to detect the position of each of the obstructions α and β differently and preciously, As shown by the slant lines in FIG. 21, the obstruction is detected by the ultrasonic wave transmitter/receiver means 171 and displayed with the black symbol on the LC display 27. In addition to this, as shown in FIG. 20, it is possible for the driver to recognize the position of the obstruction preciously by displaying the range where the ultrasonic wave transmitter/receiver means detects no obstruction as designated by the reference character γ.

As described above, according to the obstruction detection apparatus of the ninth embodiment, since the range of the positions where no obstruction is detected, for example, as shown by the slant lines γ in FIG. 20, is displayed with a half tone dot meshing on the LC display device 27, it is possible for the driver in the vehicle to predict the position of the obstruction easily, and it is thereby possible for the driver to recognize a safe area preciously.

As described above in detail, according to the present invention, the CPU as the control means calculates the distance between a vehicle and an obstruction based on the time interval from a time at which the ultrasonic wave transmitter/receiver means transmits ultrasonic wave to a time at which the ultrasonic wave transmitter/receiver means receives the ultrasonic wave reflected by the obstruction, and the control means stores data corresponding to the calculated distance into the distance table. The display means displays the range in which no obstruction is detected according to the data stored in the distance table. The alarm means sounds an alarm for the driver according to the data stored in the distance table. It is thereby possible to display the position of the obstruction preciously and for the driver to recognize the position fo the obstruction easily and certainly.

In addition, according to the present invention, the control means calculates the distance between a vehicle and an obstruction based on the time interval from a time at which the ultrasonic wave transmitter/receiver means transmits ultrasonic wave to a time at which the ultrasonic wave transmitter/receiver means receives the ultrasonic wave reflected by the obstruction, and the control means stores data corresponding to the calculated distance into the distance table. The display means displays the range in which the obstruction is detected according to the data stored in the distance table. The alarm means sounds an alarm for the driver according to the data stored in the distance table. It is thereby possible to display the position of the obstruction preciously and for the driver to recognize the position fo the obstruction easily and certainly.

Furthermore, according to the present invention, the obstruction detection apparatus includes memory fields forming the distance table for both the direct transmitting/receiving processes in which the same ultrasonic wave transmitter/receiver means transmits and also receives the ultrasonic wave and indirect transmitting/receiving processes in which different ultrasonic transmitter/receiver means transmits and receives the ultrasonic wave. For example, even if the number of the ultrasonic wave transmitter/receiver means is decreased, it is possible for the driver to recognize the position of the obstruction with a high resolution.

Moreover, according to the present invention, at least one of the plurality of ultrasonic wave transmitter/receiver means are installed at corner sections of the vehicle, and when the ultrasonic wave transmitter/receiver means installed at the corner sections transmit the ultrasonic wave and directly receive the ultrasonic wave reflected by the obstruction, the control means uses the ultrasonic wave transmitter/receiver means as corner sensors, and the display means displays information of the position of the obstruction obtained by the ultrasonic wave reflected by the obstruction. It is therefore possible to install any additional corner sensors, and it is thereby possible for the driver to recognize the obstruction around the corner section of the vehicle preciously.

In addition, according to the present invention, the bar sections on the LC display device has a lattice shape, and the position information of the obstruction is displayed according to the distance between the vehicle and the obstruction, it is thereby possible for the driver to recognize the position of the obstruction preciously and easily.

Moreover, according to the present invention, the control means calculates the distance from the vehicle to the obstruction in consideration of the distance difference between the tip section or the projecting section of the vehicle and the ultrasonic wave transmitter/receiver means, and stores the calculated data into the distance table. It is thereby possible for the driver to recognize the position of the obstruction more preciously.

While the above provides a full and complete disclosure of the preferred embodiments of the present invention, various modifications, alternate constructions and equivalents may be employed without departing from the scope of the invention. Therefore the above description and illustration should not be construed as limiting the scope of the invention, which is defined by the appended claims.

What is claimed is:

1. An obstruction detection apparatus comprising:

a plurality of ultrasonic wave transmitter/receiver means installed on a vehicle for transmitting ultrasonic wave and for receiving the ultrasonic wave reflected by an obstruction;

control means including a distance table for calculating a distance between said vehicle and said obstruction based on a time interval from a time at which the ultrasonic wave is transmitted to a time at which the ultrasonic wave reflected by said obstruction is received by said plurality of ultrasonic wave transmitter/receiver means, and for storing data corresponding to the calculated distance into memory fields forming said distance table;

display means for displaying a range where no obstruction is detected by said plurality of ultrasonic wave transmitter/receiver means based on the data stored in said distance table; and alarm means for sounding an alarm about said obstruction for a driver of said vehicle based on the data stored in said distance table, wherein said distance table comprising a plurality of memory fields corresponding to a case in which a same ultrasonic wave transmitter/receiver means transmits said ultrasonic wave and receives the ultrasonic wave reflected by said obstruction and a case in which a different ultrasonic wave transmitter/receiver means transmits the ultrasonic wave and receives the ultrasonic wave reflected by said obstruction.

2. An obstruction detection apparatus as claimed in claim 1, wherein at least one of said plurality of ultrasonic wave transmitter/receiver means are installed at corner sections of said vehicle, and when said ultrasonic wave transmitter/receiver means installed at said corner sections transmit the ultrasonic wave and directly receive the ultrasonic wave reflected by said obstruction, said control means uses said ultrasonic wave transmitter/receiver means as a corner sensor, and said display means displays information of a position of said obstruction obtained by said ultrasonic wave reflected by said obstruction.

3. An obstruction detection apparatus as claimed in claim 1, wherein said display means comprises a plurality of display bars of a lattice shape, and lights said display bars corresponding to data stored in said distance table.

4. An obstruction detection apparatus as claimed in claim 1, wherein said control means calculates a distance between said vehicle and said obstruction in consideration of a distance difference between a tip section of said vehicle and said plurality of ultrasonic wave transmitter/receiver means.

5. An obstruction detection apparatus comprising:

a plurality of ultrasonic wave transmitter/receiver means installed on a vehicle for transmitting ultrasonic wave and for receiving the ultrasonic wave reflected by an obstruction;

control means including a distance table for calculating a distance between said vehicle and said obstruction based on a time interval from a time at which the ultrasonic wave is transmitted to a time at which the ultrasonic wave reflected by said obstruction is received by said plurality of ultrasonic wave transmitter/receiver means, and for storing data corresponding to the calculated distance into memory fields forming said distance table;

display means for displaying a range where said obstruction is detected by said plurality of ultrasonic wave transmitter/receiver means based on the data stored in said distance table; and alarm means for sounding an alarm about said obstruction for a driver of said vehicle based on the data stored in said distance table, wherein said distance table comprising a plurality of memory fields corresponding to a case in which a same ultrasonic wave transmitter/receiver means transmits said ultrasonic wave and receives the ultrasonic wave reflected by said obstruction and a case in which a different ultrasonic wave transmitter/receiver means transmits the ultrasonic wave and receives the ultrasonic wave reflected by said obstruction.

6. An obstruction detection apparatus as claimed in claim 2, wherein at least one of said plurality of ultrasonic wave transmitter/receiver means are installed at corner sections of said vehicle, and when said ultrasonic wave transmitter/receiver means installed at said corner sections transmit the ultrasonic wave and directly receive the ultrasonic wave reflected by said obstruction, said control means uses said ultrasonic wave transmitter/receiver means as a corner sensor, and said display means displays information of a position of said obstruction obtained by said ultrasonic wave reflected by said obstruction.

7. An obstruction detection apparatus as claimed in claim 2, wherein said display means comprises a plurality of display bars of a lattice shape, and lights said display bars corresponding to data stored in said distance table.

8. An obstruction detection apparatus as claimed in claim 5, wherein said control means calculates a distance between said vehicle and said obstruction in consideration of a distance difference between a tip section of said vehicle and said plurality of ultrasonic wave transmitter/receiver means.

9. An obstruction detection apparatus comprising:

a first transmitter installed on a vehicle that transmits a first transmitted wave towards an obstruction, wherein the first transmitted wave reflects off of the obstruction to produce a first reflected wave;

a first receiver installed on the vehicle that receives at least a first reflected portion of the first reflected wave;

a second receiver installed on the vehicle that receives at least a second reflected portion of the first reflected wave;

a control circuit that calculates a distance between the vehicle and the obstruction based on a first reception time when the first receiver receives at least the first reflected portion of the first reflected wave and based on a second reception time when the second receiver receives at least the second reflected portion of the first reflected wave, wherein the control circuit generates distance data corresponding to the calculated distance; and a display circuit that provides information to a driver of the vehicle, wherein the information indicates the distance between the vehicle and the obstruction based on the distance data.

10. The apparatus as claimed in claim 9, further comprising:

an alarm that informs the driver about the obstruction based on the distance data.

11. The apparatus as claimed in claim 9, wherein the control circuit comprises a distance table that stores the distance data.

12. The apparatus as claimed in claim 11, wherein the display circuit provides the information based on the distance data stored in the distance table.

13. The apparatus as claimed in claim 11, wherein the distance data comprises first distance data and second distance data, wherein the control circuit generates the first distance data based on the first reception time when the first receiver receives at least the first reflected portion of the first reflected wave and generates the second distance data based on the second reception time when the second receiver receives at least the second reflected portion of the first reflected wave, wherein the distance table comprises a first memory field and a second memory field, and wherein the control circuit stores the first distance data in the first memory field and stores the second distance data in the second memory field.

14. The apparatus as claimed in claim 13, wherein the display device comprises a first illumination element and a second illumination element, wherein the display device places the first illumination element in an illumination state based on the first distance data stored in the first memory field and places the second illumination element in an illumination state based on the second distance data stored in the second memory field.

15. The apparatus as claimed in claim 9, wherein the first transmitted wave transmitted by the first transmitter comprises a first transmitted portion and a second transmitted portion, wherein the first transmitted portion reflects off of the obstruction to produce the first reflected portion and the second transmitted portion reflects off of the obstruction to produce the second reflected portion, wherein the control circuit instructs the first transmitter to transmit the first transmitted portion at a first transmission time and instructs the first transmitter to transmit the second transmitted portion at a second transmission time that is different from the first transmission time, and wherein the control circuit calculates the distance between the vehicle and the obstruction based on a first difference between the first transmission time and the first reception time and based on a second difference between the second transmission time and the second reception time.

16. The apparatus as claimed in claim 15, wherein the distance data comprises first distance data and second distance data, and wherein the control circuit generates the first distance data based on the first difference and generates the second distance data based on the second difference.

17. The apparatus as claimed in claim 16, wherein the control circuit comprises a distance table having a first memory field and a second memory field, wherein the control circuit stores the first distance data in the first memory field and stores the second distance data in the second memory field.

18. The apparatus as claimed in claim 17, wherein the display device comprises a first illumination element and a second illumination element, wherein the display device places the first illumination element in an illumination state based on the first distance data stored in the first memory field and places the second illumination element in an illumination state based on the second distance data stored in the second memory field.

19. The apparatus as claimed in claim 18, further comprising a second transmitter installed on the vehicle, wherein the second transmitter outputs a second transmitted wave towards the obstruction and the second transmitted wave reflects off of the obstruction to produce a second reflected wave, wherein the second receiver receives at least a first reflected portion of the second reflected wave, and wherein the control circuit calculates the distance between the vehicle and the obstruction based on the first reception time when the first receiver receives at least the first reflected portion of the first reflected wave, based on the second reception time when the second receiver receives at least the second reflected portion of the first reflected wave, and based on a third reception time when the second receiver receives at least the first reflected portion of the second reflected wave.

20. The apparatus as claimed in claim 19, wherein the distance table further comprises a third memory field and wherein the distance data further comprises third distance data, wherein the control circuit generates the third distance data based on the third reception time when the second receiver receives at least the first reflected portion of the second reflected wave, and wherein the controller stores the third distance data in the third memory field.

21. The apparatus as claimed in claim 20, wherein the display device comprises a third illumination element and places the third illumination element in an illumination state based on the third distance data stored in the third memory field.

22. The apparatus as claimed in claim 20, wherein the control circuit instructs the second transmitter to transmit the second transmitted wave at a third transmission time that is different from the first transmission time and the second transmission time, and wherein the control circuit calculates the distance between the vehicle and the obstruction based on a third difference between the third transmission time and the third reception time.

23. The apparatus as claimed in claim 9, further comprising a second transmitter installed on the vehicle, wherein the second transmitter outputs a second transmitted wave towards the obstruction and the second transmitted wave reflects off of the obstruction to produce a second reflected wave, wherein the second receiver receives at least a first reflected portion of the second reflected wave, and wherein the control circuit calculates the distance between the vehicle and the obstruction based on the first reception time when the first receiver receives at least the first reflected portion of the first reflected wave, based on the second reception time when the second receiver receives at least the second reflected portion of the first reflected wave, and based on a third reception time when the second receiver receives at least the first reflected portion of the second reflected wave.

* * * * *